(12) United States Patent
Toriyama et al.

(10) Patent No.: US 8,643,470 B2
(45) Date of Patent: Feb. 4, 2014

(54) SEMICONDUCTOR INTEGRATED CIRCUIT, IC CARD MOUNTED WITH THE SEMICONDUCTOR INTEGRATED CIRCUIT, AND OPERATION METHOD FOR THE SAME

(75) Inventors: Akihiro Toriyama, Tokyo (JP); Kazuki Watanabe, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1263 days.

(21) Appl. No.: 12/470,942

(22) Filed: May 22, 2009

(65) Prior Publication Data

US 2009/0322484 A1  Dec. 31, 2009

(30) Foreign Application Priority Data

Jun. 27, 2008  (JP) ................................. 2008-168471

(51) Int. Cl.
*H04Q 5/22* (2006.01)
*H04B 5/00* (2006.01)
*G06K 19/00* (2006.01)

(52) U.S. Cl.
USPC ................... 340/10.1; 340/572.1; 340/572.5; 455/41.1; 235/487

(58) Field of Classification Search
USPC .................. 340/10.1–10.54, 572.1; 455/41.1; 235/487
See application file for complete search history.

(56) References Cited

U.S. PATENT DOCUMENTS

| | | | |
|---|---|---|---|
| 6,213,402 B1 | 4/2001 | Reiner | |
| 7,055,752 B2 | 6/2006 | Yoshimoto et al. | |
| 7,209,768 B2 | 4/2007 | Yonekura et al. | |
| 7,309,018 B2 | 12/2007 | Nakadai et al. | |

(Continued)

FOREIGN PATENT DOCUMENTS

| | | |
|---|---|---|
| JP | 09-101941 A | 4/1997 |
| JP | 2000-172806 A | 6/2000 |

(Continued)

OTHER PUBLICATIONS

Jung-Hyun Cho et al, "An NFC Transceiver with RF-Powered RFID transponder mode," IEEE Asian Solid-State Circuits Conference; Nov. 12, 2007; pp. 172-175.

(Continued)

*Primary Examiner* — Daniel Wu
*Assistant Examiner* — Mancil Littlejohn, Jr.
(74) *Attorney, Agent, or Firm* — Miles & Stockbridge, P.C.

(57) ABSTRACT

A semiconductor integrated circuit and an IC card mounted with the same are provided, in which a signal of any one of at least three kinds of reception signals can be received for a short time. An RF signal from an antenna is supplied in parallel to a first and a second demodulator circuit included in a demodulator circuit. The first demodulator circuit demodulates a first reception signal of a first degree of modulation. The second demodulator circuit demodulates a second reception signal having a first communication start signal (SOF), and a third reception signal having a second communication start signal (Preamble). The demodulated output signals of the first and the second demodulator circuit are supplied to a determination circuit. When the demodulation output by the first demodulator circuit is determined, it is determined that the first reception signal is currently received. When the demodulation output of the second reception signal by the second demodulator circuit is determined, it is determined that the second reception signal is currently received. When the demodulation output of the third reception signal by the second demodulator circuit is determined, it is determined that the third reception signal is currently received.

18 Claims, 15 Drawing Sheets

(56) References Cited

U.S. PATENT DOCUMENTS

| | | | |
|---|---|---|---|
| 7,364,083 B2 | 4/2008 | Ogawa et al. | |
| 8,240,557 B2 * | 8/2012 | Fernandes et al. | 235/380 |
| 2005/0056704 A1 | 3/2005 | Kim | |
| 2005/0224589 A1 | 10/2005 | Park et al. | |
| 2006/0038024 A1 | 2/2006 | Nakadai et al. | |
| 2007/0026825 A1 | 2/2007 | Wilson | |
| 2008/0088366 A1 | 4/2008 | Nakadai et al. | |
| 2008/0246667 A1 | 10/2008 | Symons | |
| 2009/0011706 A1 | 1/2009 | Wilson et al. | |
| 2009/0101716 A1* | 4/2009 | Mani et al. | 235/441 |
| 2010/0056053 A1* | 3/2010 | Breitfuss et al. | 455/41.2 |

FOREIGN PATENT DOCUMENTS

| | | | |
|---|---|---|---|
| JP | 2000-510633 T | 8/2000 | |
| JP | 2002-335344 A | 11/2002 | |
| JP | 2002-342725 A | 11/2002 | |
| JP | 2003-233787 A | 8/2003 | |
| JP | 2003-249870 A | 9/2003 | |
| JP | 2006-060363 A | 3/2006 | |
| JP | 2006-072678 A | 3/2006 | |
| JP | 2008-059271 A | 3/2008 | |
| WO | WO 01/91046 A1 | 11/2001 | |
| WO | WO2006/095186 A1 | 9/2006 | |
| WO | WO2007/135434 A1 | 11/2007 | |

OTHER PUBLICATIONS

Office Action from European Patent Application No. 09 251 325.8.

D. Baddeley, "Identification cards—Contactless integrated circuit(s) cards—Proximity cards—Part 2: Radio frequency power and signal interface", Final Committee Draft ISO/IEC 14443-2, pp. i-iv and 5-15 & Annex A, Mar. 26, 1999.

D. Baddeley, "Identification cards—Contactless integrated circuit(s) cards—Proximity cards—Part 3: Initialization and anticollision", Final Committee Draft ISO/IEC 14443-3, pp. i-iv and 1-38 & Annex C-D pp. 1-5, Jun. 11, 1999.

"Information technology—Telecommunications and information exchange between systems—Near Field Communication—Interface and Protocol (NFCIP-1)", International Standard ISO/IEC 18092, pp. i-vi and 1-58, Apr. 1, 2004.

Office Action issued Nov. 8, 2012, in Japanese Patent Application No. 2008-168471.

* cited by examiner

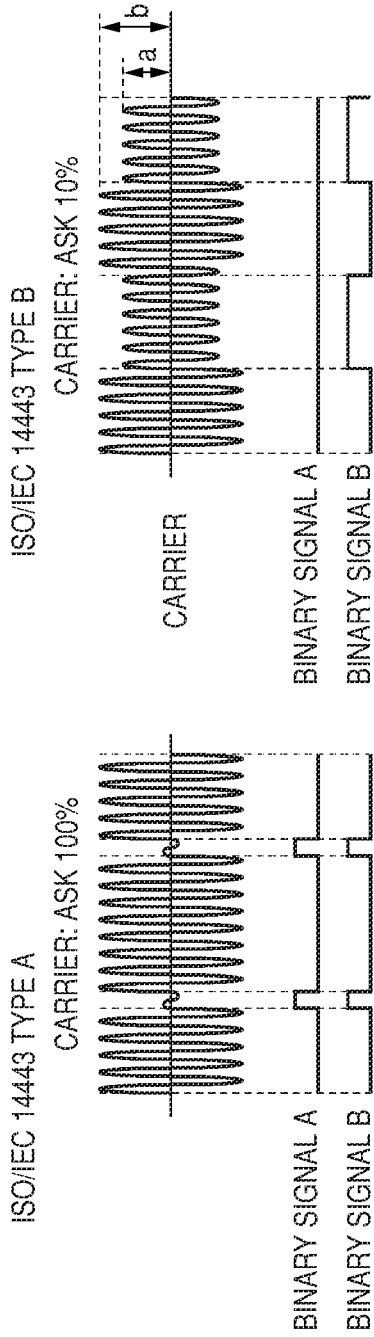
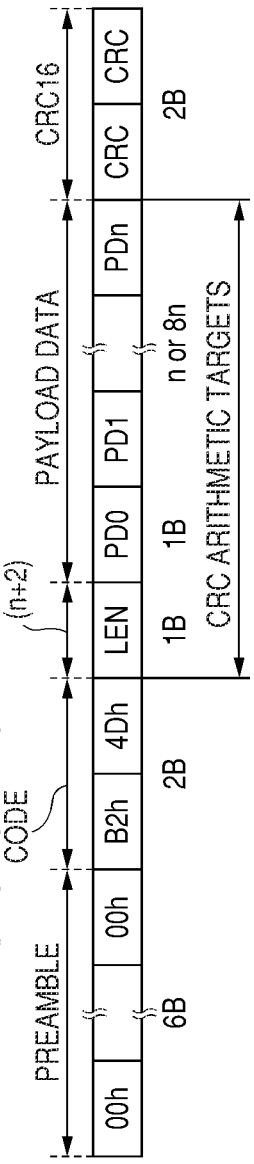
FIG. 2(A)
FIG. 2(B)
FIG. 3
FIG. 4

SEMICONDUCTOR INTEGRATED CIRCUIT, IC CARD MOUNTED WITH THE SEMICONDUCTOR INTEGRATED CIRCUIT, AND OPERATION METHOD FOR THE SAME

CROSS REFERENCES TO RELATED APPLICATIONS

The disclosure of Japanese Patent Application No. 2008-168471 filed on Jun. 27, 2008 including the specification, drawings and abstract is incorporated herein by reference in its entirety.

BACKGROUND OF THE INVENTION

The present invention relates to a semiconductor integrated circuit, an IC card mounted with the semiconductor integrated circuit, and an operation method for the same, and especially relates to technology which is useful to receive a signal of any one of at least three kinds of reception signals for a short time.

According to the international standard ISO/IEC 14443, an IC card which has a noncontact interface is called a PICC and performs RF communication with a reader/writer called a PCD. ISO stands for the International Organization for Standardization, and IEC stands for the International Electrotechnical Commission. PICC stands for Proximity Card and PCD for Proximity Coupling Device.

For example, as indicated in the following Non-patent Document 1, in Type A of the international standard ISO/IEC 14443, communication from a PCD to a PICC uses a coding system based on a modified Miller method in an ASK 100% amplitude modulation method. However, in Type B of the international standard ISO/IEC 14443, communication from the PCD to the PICC uses a coding method based on an NRZ-L method in an ASK 10% amplitude modulation method. NRZ-L stands for Non Return to Zero-Level. ASK stands for Amplitude Shift Keying, which is one of the digital modulation methods.

For example, as indicated in the following Non-patent Document 2, the international standard ISO/IEC 14443 specifies that a request should be accepted within 5 msec after the PICC goes into an operation field. It is also specified that the PICC of Type A should accept a request command of Type A within 5 msec, regardless of what command of Type B is received. It is similarly specified that the PICC of Type B should accept a request of Type B within 5 msec, regardless of what command of Type A is received.

Further, as described in Non-patent Document 2, in initialization of Type A, the PICC of Type A shifts from an idle state to a ready state by a request command of Type A, and shifts from the ready state to an active state by a select command, and shifts from the active state to a halt state by a halt command. The ready state has an anticollision loop.

As described in Non-patent Document 2 and Patent Document 5 in the following, in initialization of Type B, a PICC of Type B waits for a request command of Type B in the idle state. This request command makes the PICC of Type B be prepared to generate an application family identifier (AFI), an attribute information parameter (PARAM), and a cyclic redundancy check error detection code (CRC). Upon detecting coincidence of AFI, the PICC of Type B transmits a response to the request of Type B to the PCD. This response includes a pseudo unique identifier (PUPI), application information (application data), protocol information, and a cyclic redundancy check error detection code (CRC). Subsequently, upon accepting a PICC select command, the PICC of Type B transmits a response to the accepting to the PCD and shifts to an active state. The transmitting data of Type B is called a character as a frame, and the frame is bounded by SOF (Start Of Frame) and EOF (End Of Frame). Each of SOF and EOF includes one falling edge and the logic "0" of a predetermined length.

In recent years, a short-range wireless communication technology, called Near Field Communication (NFC), has been in widespread use, which realizes consumer-oriented wireless communication connection among home electric appliances and digital media, and simplifies and expands processing of contents and business account. This NFC technology has compatibility with existing various communication methods, and makes it possible to execute the short-range communication at the maximum communication rate of 847 kbps and at the distance of about 10 cm, using an RF frequency of 13.56 MHz. Especially, the NFC technology is mounted in a mobile phone terminal having a built-in IC card microcomputer (secure chip) with an electronic settlement function, aiming at enhancement of the convenience on the side of end users by practical use to various noncontact electronic settlements, such as noncontact payment of the merchandise purchased at a store, noncontact payment of the transportation expenses at a station, etc. NFC stands for Near Field Communication.

Non-patent Document 3 in the following describes the contents of NFC of the international standard ISO/IEC 18092. The communication at a transfer rate of 212 kbps to 424 kbps of NFC of ISO/IEC 18092 employs a coding system based on a Manchester method with the modulation method of an ASK 8 to 30% amplitude modulation. In a passive communication mode, an initiator generates an RF electric field which supplies energy to a target. On the other hand, in the active communication mode, the initiator and the target generate an RF electric field alternately.

In initialization of communication at one of three transfer rates (106, 212, and 424 kbps) of ISO/IEC 18092, the application is switched to the active communicate mode, and one of the three transfer rates is chosen. In initialization of the passive communication mode at a transfer rate of 212 kbps or 424 kbps, a preamble is inserted before a data packet. The preamble includes 48 bits at minimum into which the logic "0" is encoded.

Patent Document 1 in the following describes a noncontact IC card which can be communicated according to an application, by the judgment part of a CPU specifying the modulation method and coding system of a signal which is transmitted from a card reader/writer by following various communication procedure of ISO/IEC 14443.

Patent Document 2 in the following describes a proximity-type noncontact IC card, in which a request signal of Type A of ISO/IEC 14443 is processed by an ASK 100% amplitude demodulation circuit and a modified Miller decoding circuit, and a request signal of Type B is processed by an ASK 10% amplitude demodulation circuit and an NRZ-L decoding circuit. Since one of request signals of Type A and Type B is received and the other request signal is processed erroneously and becomes a meaningless bit string, an arithmetic circuit compares both output values and chooses a signal which is meaningful. An application for arithmetic operation is stored in a nonvolatile memory of the IC card, and a communication method can use either Type A or Type B. However, a priority table of the IC card describes that the priority of Type B is set higher from the reasons of the insufficient margin of the supply voltage due to a reader/writer device, etc.

On the other hand, Patent Document 3 in the following describes a noncontact IC card which includes components such as an antenna coil, a rectifier circuit, a power circuit, a CPU, a demodulator circuit, a modulator circuit, a noncontact control circuit, a ROM, a RAM, and an EEPROM. The components other than the antenna coil are integrated over a silicon substrate. The noncontact control circuit includes a first detector circuit which detects a preamble of a high-speed type, and a second detector circuit which detects SOF of Type B of ISO/IEC 14443. The high-speed type is a header system of the preamble in a Manchester coding method, and Type B is a header system of SOF in an NRZ coding method. A header detection signal of the first detector circuit and a header detection signal of the second detector circuit are supplied to a communication method detecting circuit. The output from the first detector circuit is processed by a first processing by the program execution of the CPU, and the output from the second detector circuit is processed by a second processing by the program execution of the CPU. Execution of useless processing of one of the first processing and the second processing is prohibited by a coincidence detection output signal of the high-speed type or Type B in the communication method detecting circuit.

Patent Document 4 in the following describes a noncontact IC card which distinguishes a long time width of a logical value "0" of the SOF signal added to the top of transmitting data in Type B of ISO/IEC14443 and a short time width of a logical value "0" of the transmission data of the Manchester code of ISO/IEC 18092.

(Non-patent Document 1) D. Baddeley, "Final Committee Draft ISO/IEC 14443-2" Identification cards—Contactless integrated circuit(s) cards—Proximity cards—Part 2: Radio frequency power and signal interface, http://www.waaza.org/download/fcd-14443-2.pdf (searched on May 30, 2008).

(Non-patent Document 2) D. Baddeley, "FINAL COMMITTEE DRAFT ISO/IEC 14443-3" Identification cards—Contactless integrated circuit(s) cards—Proximity cards—Part 3: Initialization and anticollision, http://www.waaza.org/download/fcd-14443-3.pdf (searched on May 30, 2008.)

(Non-patent Document 3) INTERNATIONAL STANDARD ISO/IEC 18092, "Information technology—Telecommunications and information exchange between systems—Near Field Communication—Interface and Protocol (NFCIP-1)", http://stadards.iso.org/ittf/licence.html (searched on May 30, 2008.)

(Patent Document 1) Japanese Patent Laid-open No. 2008-059271

(Patent Document 2) Japanese Patent Laid-open No. 2003-249870

(Patent Document 3) Japanese Patent Laid-open No. 2006-060363

(Patent Document 4) Japanese Patent Laid-open No. 2006-072678

(Patent Document 5) U.S. Pat. No. 7,364,083-B2, Specification

SUMMARY OF THE INVENTION

In advance of the present invention, the present inventors were engaged in development of an IC card which had a noncontact interface mounted in a mobile phone which used an NFC technology in communication with a noncontact reader/writer device. It has become necessary for the noncontact IC card to mount three kinds of communication functions of NFC: a communication function of Type A of ISO/IEC 14443, a communication function of Type B of ISO/IEC 14443, and a communication function of ISO/IEC 18092, as described above.

The noncontact IC card may not only be mounted in a mobile phone with a battery but may be used as an IC card single body without a battery. In the environment where the noncontact IC card is used as an IC card single body without a battery, operation power voltage for an internal circuit of the IC card is supplied only by operating voltage generated by rectifying and smoothing an RF carrier signal which is transmitted by the noncontact reader/writer device and received by an antenna. The antenna which receives the RF carrier signal from the noncontact reader/writer device is composed by a spiral-shaped coil formed of a printed wiring which is disposed over the surface of a resin-molded insulating substrate of the IC card. The driving ability of the operating voltage generated by rectifying and smoothing the RF carrier signal received with the antenna is comparatively small.

On the other hand, in the practical operating environment of the noncontact IC card, it is difficult to predict that the noncontact IC card enters within the communication range of which type of a noncontact reader/writer device among the three kinds. On the other hand, the IC cards of Type A and Type B specified by the international standard ISO/IEC 14443 need to accept a request command within 5 msec after going into an operation field. However, the examination by the present inventors has clarified that it is difficult to operate in parallel three detector circuits for three commands which accept three kinds of request commands, under the comparatively small driving ability of the operating voltage generated by rectifying and smoothing the RF carrier signal received by the antenna. On the other hand, the present inventors have studied the method to switch at random the command receiving function of the detector circuit for one command. However, the examination by the present inventors has clarified that it is also difficult to receive a request command within 5 msec which is specified by the international standard.

The present invention is accomplished as a result of the examinations conducted by the present inventors in advance of the present invention.

Therefore, one purpose of the present invention is to accept a reception signal of any type of at least three kinds of reception signals for a short time.

Another purpose of the present invention is to reduce power consumption at the time of receiving a reception signal of any one of the above-mentioned types. Yet another purpose of the present invention is to make operation possible under the small driving ability of the operating voltage generated from an RF signal received by an antenna.

The other purposes and the new feature of the present invention will become clear from the description of the present specification and the accompanying drawings.

The following is a brief explanation of typical one of the inventions disclosed in the present application.

That is, a typical semiconductor integrated circuit (U2) according to the present invention includes a first antenna coupling terminal (LA), a second antenna coupling terminal (LB), a power circuit (U3), a demodulator circuit (U7), and a determination circuit (U16).

An RF signal by an antenna (L1) is supplied between the first antenna coupling terminal and the second antenna coupling terminal. The power circuit generates operating voltage ($V_{DD}$) by rectifying and smoothing the RF signal and supplies the generated operating voltage to the demodulator circuit and the determination circuit.

The demodulator circuit (U7) includes a first demodulator circuit (U14) and a second demodulator circuit (U15) to which the RF signal of the antenna (L1) is supplied in parallel. The first demodulator circuit (U14) demodulates a first reception signal (Type A) which has a first degree of modulation (100%) as the RF signal, and generates a first demodulated output signal (binary signal A). The second demodulator circuit (U15) demodulates a second reception signal (Type B) which has a second degree of modulation (10%) as the RF signal and a first communication start signal of a first format (SOF), and also demodulates a third reception signal ("18092") which has the second degree of modulation and a second communication start signal of a second format (Preamble). Accordingly, the second demodulator circuit (U15) generates a second demodulated output signal (binary signal B).

The first demodulated output signal of the first demodulator circuit (U14) and the second demodulated output signal of the second demodulator circuit (U15) are supplied to the determination circuit (U16) (refer to FIG. 1).

When the determination circuit (U16) determines that the first demodulator circuit (U14) generates the first demodulated output signal, the determination circuit (U16) determines that the first reception signal which has the first degree of modulation as the RF signal is currently received (Step F4-2, Step F4-4 in FIG. 7). When the determination circuit (U16) determines that the first demodulator circuit (U14) does not generate the first demodulated output signal, the determination circuit determines the difference between the format of the first communication start signal and the format of the second communication start signal (Step F4-3 in FIG. 7). When the determination circuit (U16) determines that the second demodulator circuit (U15) generates the second demodulated output signal by demodulating the second reception signal (Type B) with the first communication start signal of the first format, the determination circuit (U16) determines that the second reception signal is currently received (Step F4-3, Step F4-5 in FIG. 7). When the determination circuit (U16) determines that the second demodulator circuit (U15) generates the second demodulated output signal by demodulating the third reception signal ("18092") with the second communication start signal of the second format, the determination circuit (U16) determines that the third reception signal is currently received (Step F4-3, Step F4-6 in FIG. 7).

The following explains briefly the effect acquired by the typical one of the inventions disclosed by the present application. That is, according to the present invention, it is possible to accept a reception signal of any type of at least three kinds of reception signals for a short time.

BRIEF DESCRIPTION OF THE DRAWINGS

FIG. 2(A) is a drawing illustrating waveforms of a reception signal in a noncontact IC card, received from a noncontact reader/writer device, in the case where the degree of ASK modulation is 100% in Type A of ISO/IEC 14443;

FIG. 2(B) is a drawing illustrating waveforms of a reception signal in the noncontact IC card, received from the noncontact reader/writer device, in the case where the degree of ASK modulation is 10% in Type B of ISO/IEC 14443 and ISO/IEC 18092;

FIG. 3 is a drawing illustrating frame structure of transmitting data of Type B of ISO/IEC 14443;

FIG. 4 is a drawing illustrating a transmission structure of a transmission data packet of ISO/IEC 18092;

DETAILED DESCRIPTION OF THE INVENTION

Figure 1:
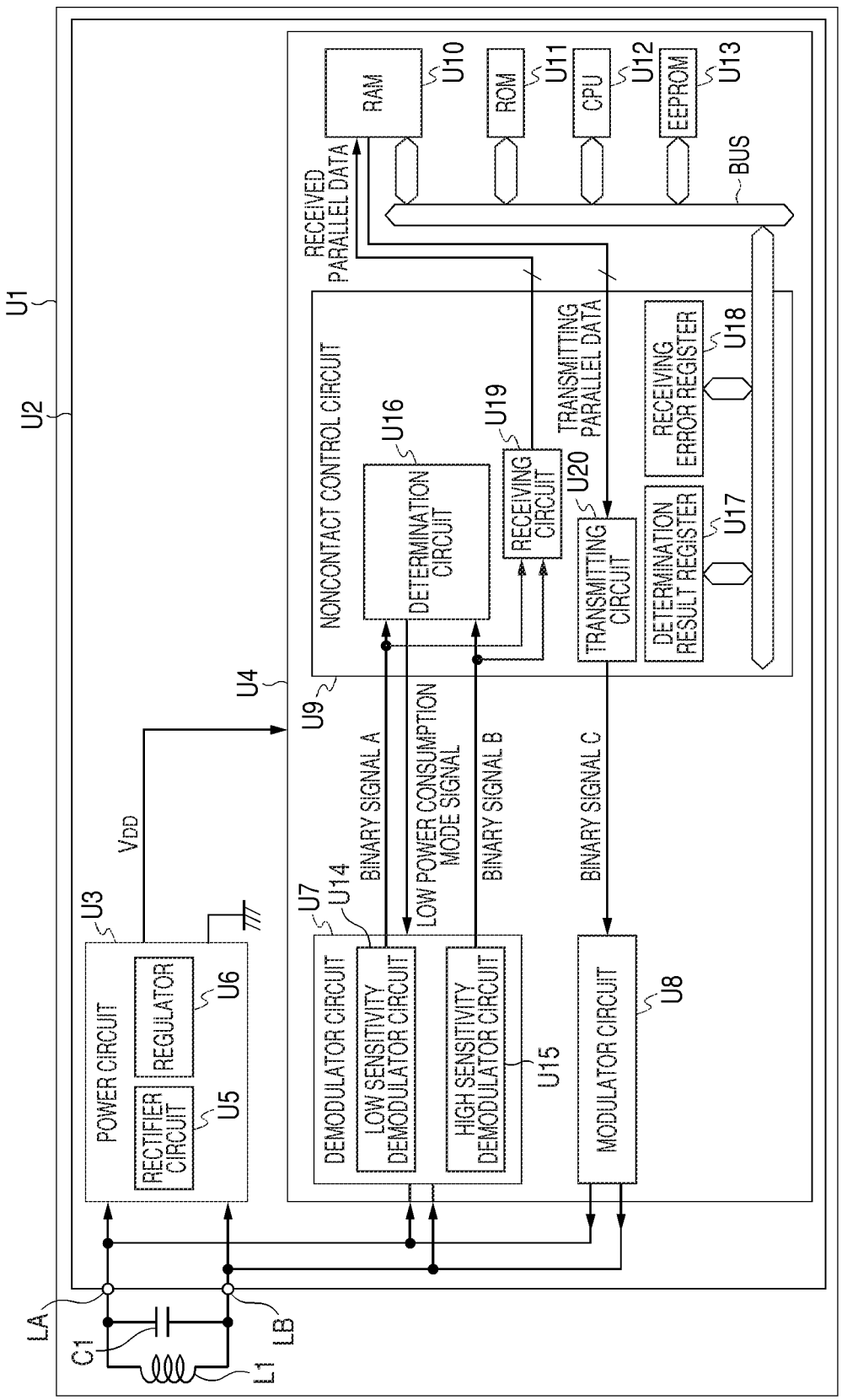
FIG. 1 is a drawing illustrating basic configuration of a noncontact IC card according to an embodiment of the present invention.

<<A typical embodiment>> First, an outline is explained on a typical embodiment of the invention disclosed in the present application. A numerical symbol in parentheses referring to a component of the drawing in the outline explanation about the typical embodiment only illustrates what is included in the concept of the component to which the numerical symbol is attached.

(1) A semiconductor integrated circuit (U2) according to a typical embodiment of the present invention includes a first antenna coupling terminal (LA), a second antenna coupling terminal (LB), a power circuit (U3), a demodulator circuit (U7), and a determination circuit (U16).

An RF signal received by an antenna (L1) is supplied between the first antenna coupling terminal and the second antenna coupling terminal. The power circuit generates operating voltage ($V_{DD}$) by rectifying and smoothing the RF signal and supplies the generated operating voltage to the demodulator circuit and the determination circuit.

The demodulator circuit (U7) includes a first demodulator circuit (U14) and a second demodulator circuit (U15). The RF signal supplied between the first antenna coupling terminal and the second antenna coupling terminal is supplied in parallel to an input of the first demodulator circuit and an input of the second demodulator circuit.

The first demodulator circuit (U14) generates a first demodulated output signal (binary signal A) by demodulating a first reception signal (Type A) which has a first degree of modulation (100%) as the RF signal.

The second demodulator circuit (U15) generates a second demodulated output signal (binary signal B) by demodulating, as the RF signal, a second reception signal (Type B) which has a second degree of modulation (10%) different from the first degree of modulation and which has a first communication start signal of a first format (SOF), and a third reception signal ("18092") which has the second degree of modulation and a second communication start signal of a second format (Preamble).

The first demodulated output signal of the first demodulator circuit (U14) and the second demodulated output signal of the second demodulator circuit (U15) are supplied to the determination circuit (U16) (refer to FIG. 1).

Figure 7:
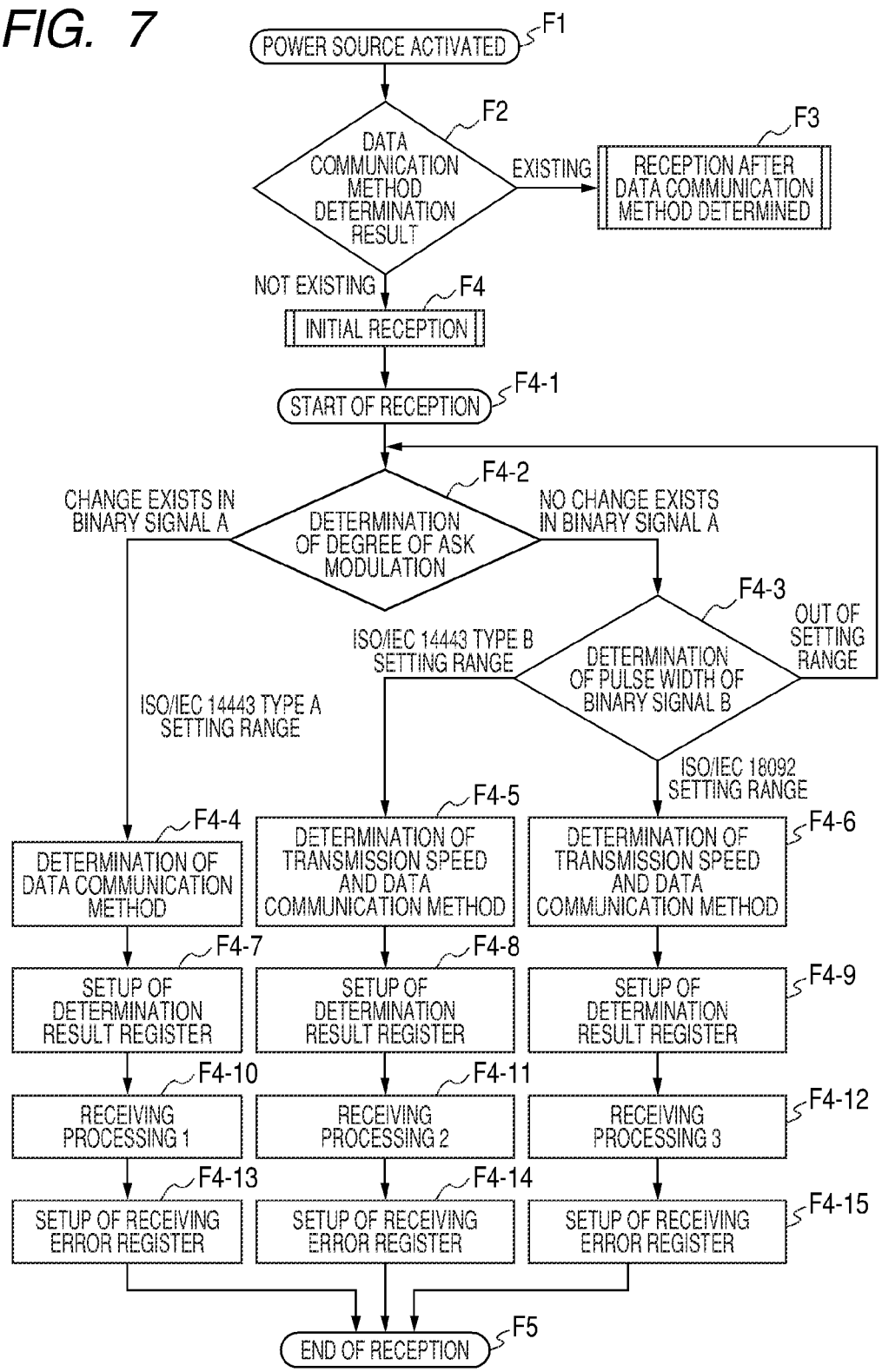
FIG. 7 is a flowchart for explaining an operation flow of the noncontact IC card of FIG. 1 in the case where the noncontact IC card detects which data communication method of Type A, Type B, and "18092" a reception signal from a noncontact reader/writer device is.

When the determination circuit (U16) determines that the first demodulator circuit (U14) generates the first demodulated output signal, the determination circuit (U16) determines that the first reception signal which has the first degree of modulation as the RF signal is currently received (Step F4-2, Step F4-4 in FIG. 7).

When the determination circuit (U16) determines that the first demodulator circuit (U14) does not generate the first demodulated output signal, the determination circuit determines the difference between the format of the first communication start signal and the format of the second communication start signal (Step F4-3 in FIG. 7).

When the determination circuit (U16) determines that the second demodulator circuit (U15) generates the second demodulated output signal by demodulating the second reception signal (Type B) which has the first communication start signal of the first format (SOF), the determination circuit (U16) determines that the second reception signal is currently received as the RF signal (Step F4-3, Step F4-5 in FIG. 7).

When the determination circuit (U16) determines that the second demodulator circuit (U15) generates the second demodulated output signal by demodulating the third reception signal ("18092") which has the second communication start signal of the second format (Preamble), the determination circuit (U16) determines that the third reception signal is currently received as the RF signal (Step F4-3, Step F4-6 in FIG. 7).

According to the embodiment, the determination of reception of three kinds of reception signals (Type A, Type B, "18092") can be made, by performing the determination processing twice by use of the first demodulator circuit (U14), the second demodulator circuit (U15), and the determination circuit (U16). First, when it is determined, by the first determination by the first demodulator circuit (U14) and the determination circuit (U16), that the first demodulator circuit (U14) generates the first demodulated output signal by demodulating the first reception signal (Type A) with the first degree of modulation (100%), it is possible to determine for an extremely short time that the first reception signal (Type A) is currently received as the RF signal. Meanwhile, it can be said that the present first determination itself is fundamentally the same as determination by selection of the ASK 100% amplitude modulation circuit, the ASK 10% amplitude modulation circuit, and the arithmetic circuit, as described in Patent Document 2.

Next, when the result of the first determination is negative, and when it is determined, by the second determination by use of the second demodulator circuit (U15) and the determination circuit (U16), that the second demodulator circuit (U15) generates the second demodulated output signal by demodulating the second reception signal (Type B) which has the first communication start signal (SOF), it is possible to determine that the second reception signal (Type B) is currently received as the RF signal. On the contrary, when the second determination determines that the second demodulator circuit (U15) generates the second demodulated output signal by demodulating the third reception signal ("18092") which has the second communication start signal (Preamble), it is possible to determine that the third reception signal ("18092") is currently received as the RF signal. Meanwhile, it can be said that the present second determination itself is fundamentally the same as the distinction between the preamble of a high-speed type and SOF of Type B described in Patent Document 3, and the distinction between SOF of type B and the logical value "0" of the transmission data of the Manchester code of "18092" described in Patent Document 4.

In the manner as described, according to the embodiment, it is possible to receive for a short time the reception signal of any type of at least three kinds of reception signals (Type A, Type B, "18092"), by performing the determination processing twice in the sequence described above. The description which suggests receiving for a short time the reception signal of any type of three kinds of the reception signals by performing the determination processing twice in the sequence described above is not found in Patent Document 2, Patent Document 3, and Patent Document 4.

Figure 14:
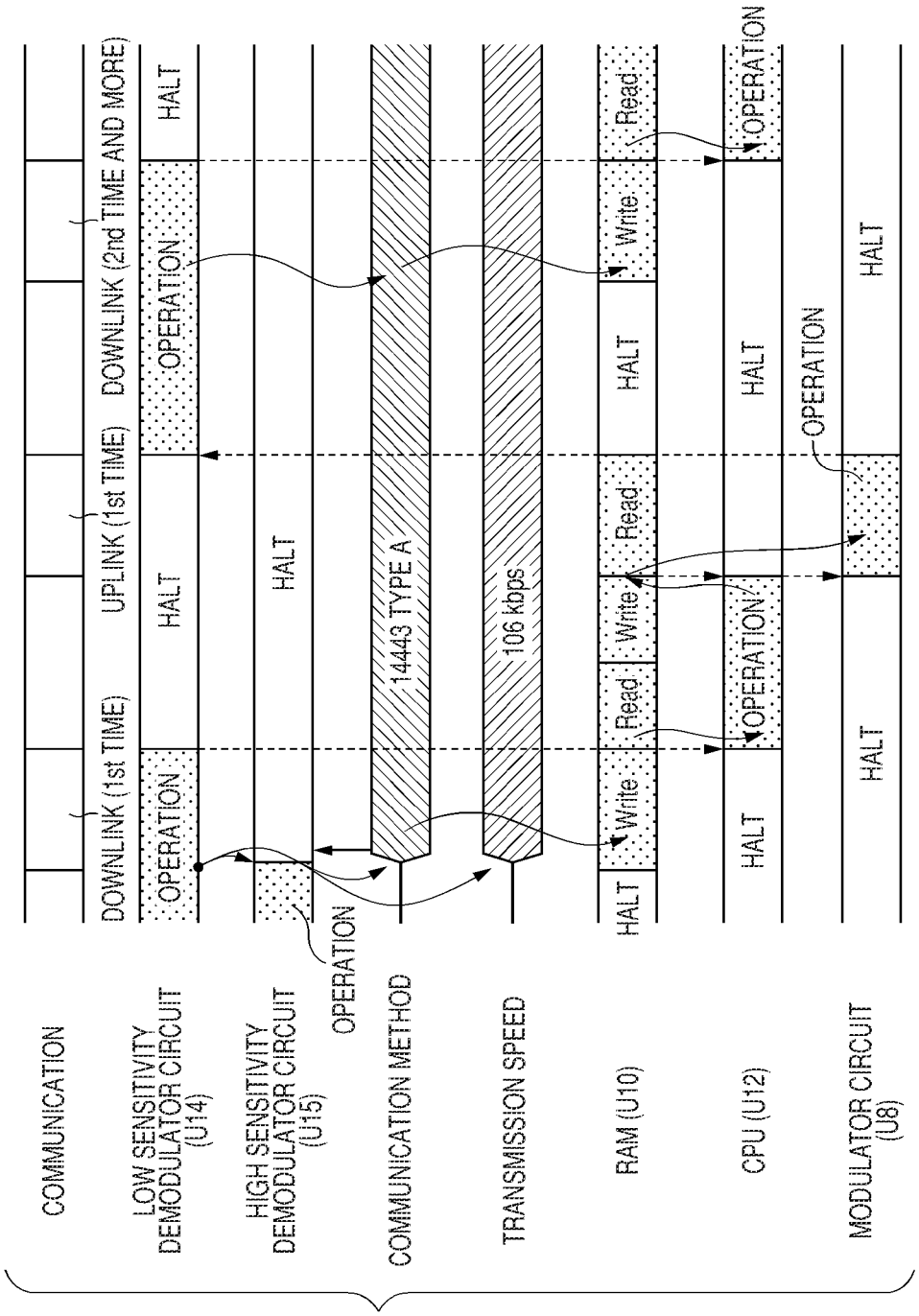
FIG. 14 is a drawing illustrating operation in the case where the noncontact IC card illustrated in FIG. 1 receives a reception signal based on the data communication method of Type A of ISO/IEC 14443, from a noncontact reader/writer device.

According to a preferred embodiment, when the determination circuit (U16) determines that the first demodulator circuit (U14) generates the first demodulated output signal, the operation of the second demodulator circuit (U15) is halted by a control signal (a low power consumption mode signal) generated by the determination circuit (refer to FIG. 1 and FIG. 14).

Figure 15:
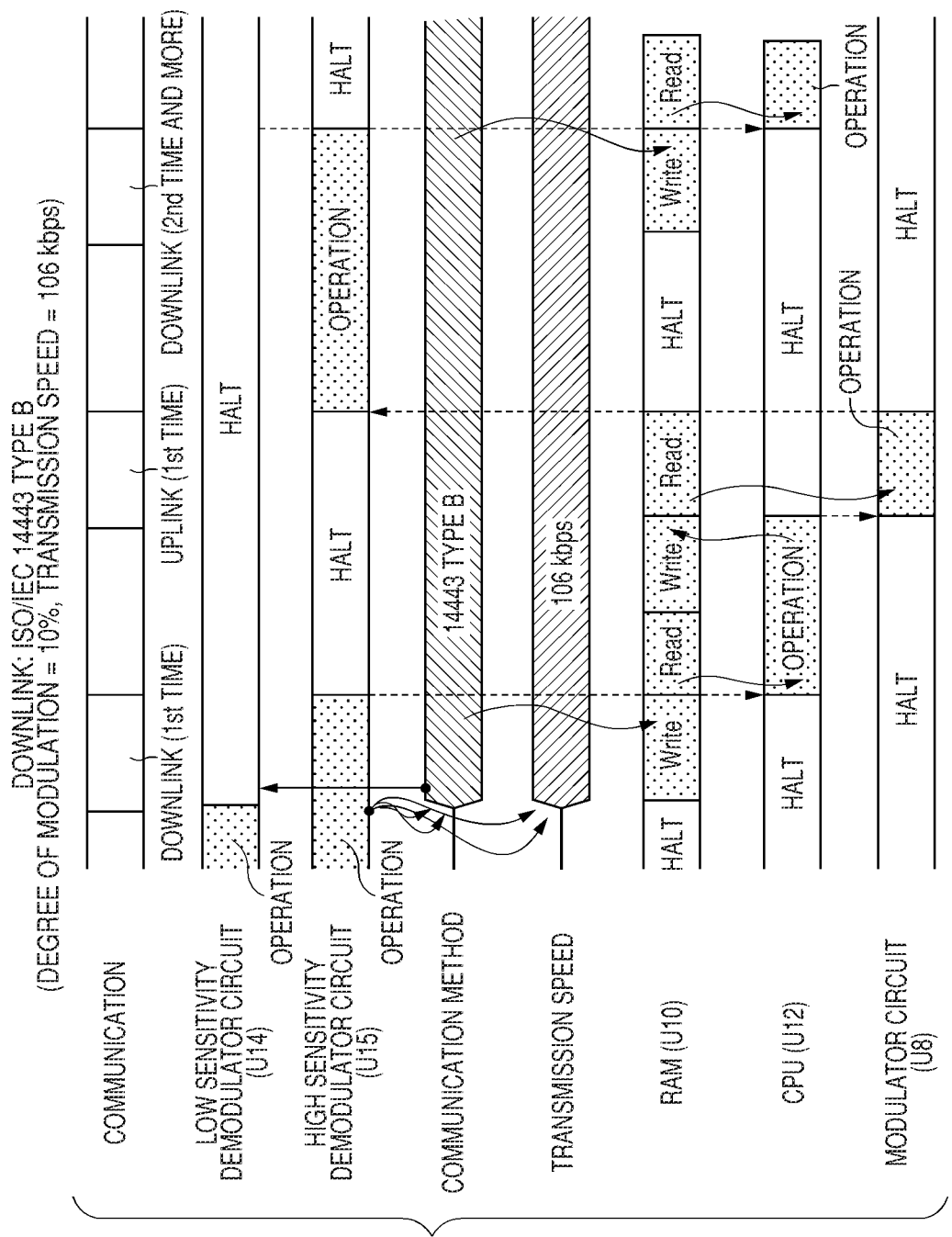
FIG. 15 is a drawing illustrating operation in the case where the noncontact IC card illustrated in FIG. 1 receives a reception signal based on the data communication method of Type B of ISO/IEC 14443, from a noncontact reader/writer device.
Figure 16:
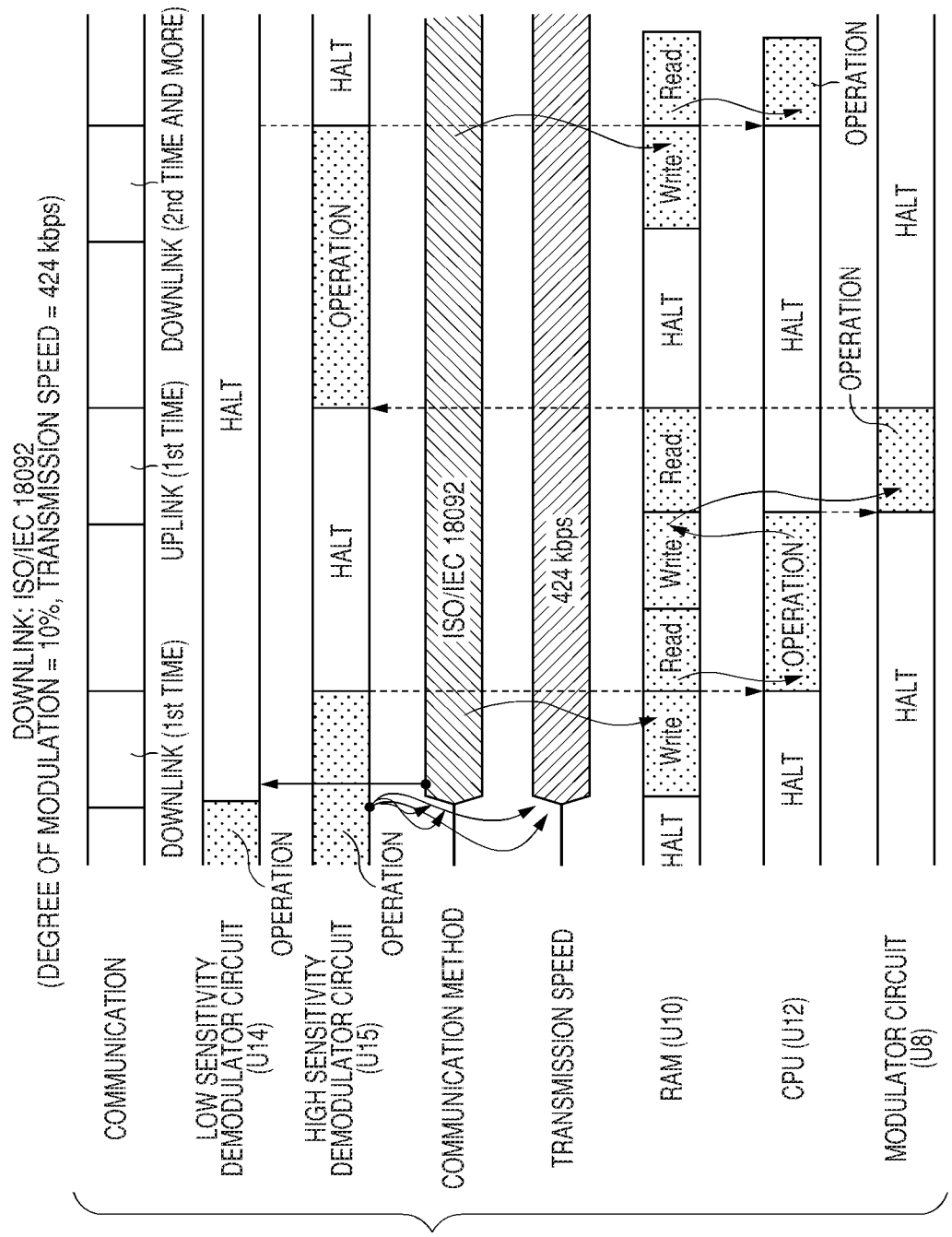
FIG. 16 is a drawing illustrating operation in the case where the noncontact IC card illustrated in FIG. 1 receives a reception signal based on the data communication method of ISO/IEC 18092, from a noncontact reader/writer device.

When the determination circuit (U16) determines that the first demodulator circuit (U14) does not generate the first demodulated output signal, the operation of the first demodulator circuit (U14) is halted by the control signal generated by the determination circuit (refer to FIG. 1, FIG. 15, and FIG. 16).

According to the preferred embodiment, it is possible to reduce the power consumption at the time of receiving at least three kinds of reception signals.

According to a more preferred embodiment, the first reception signal (Type A), the second reception signal (Type B), and the third reception signal ("18092") are ASK modulated signals, and the first degree of modulation and the second degree of modulation are the degree of ASK modulation, and the second degree of modulation has a smaller degree of ASK modulation than the first degree of modulation.

The first demodulator circuit (U14) can generate the first demodulated output signal (binary signal A) by demodulating the first reception signal (Type A) with the first degree of modulation of a large degree of ASK modulation.

The second demodulator circuit (U15) can generate the second demodulated output signal (binary signal B) by demodulating the second reception signal (Type B) with the second degree of modulation of a small degree of ASK modulation, and the third reception signal ("18092").

According to a furthermore preferred embodiment, the first communication start signal of the first format (SOF) of the second reception signal (Type B) is first header information preceding first user data (Character).

The second communication start signal of the second format (Preamble) of the third reception signal ("18092") is second header information preceding second user data (PD0, PD1 - - - PDn).

A semiconductor integrated circuit (U2) according to a specific embodiment includes further a central processing unit (U12), a random access memory (U10), nonvolatile memories (U11, U13), a receiving circuit (U19), a transmitting circuit (U20), and a modulator circuit (U8).

The processing program which the central processing unit executes is stored in the nonvolatile memory.

First received data included in the first demodulated output signal generated by the first demodulator circuit (U14), and second received data included in the second demodulated output signal generated by the second demodulator circuit (U15) are stored in the random access memory (U10) via the receiving circuit (U19).

Before storing one of the first received data and the second received data in the random access memory (U10), the central processing unit (U12) is controlled to a low power consumption state.

Responding to the storing one of the first received data and the second received data in the random access memory (U10), the central processing unit (U12) is shifted from the low power consumption state to an operating state, and the central processing unit shifted to the operating state can read the stored data of the random access memory.

The central processing unit processes the stored data read from the random access memory according to the processing program, and stores the processed data concerned in the random access memory. After storing the processed data, the central processing unit is shifted from the operating state to the low power consumption state.

The transmitting circuit (U20) reads the processed data from the random access memory (U10), and transfers the read-out data to the modulator circuit (U8). Responding to the transferred data concerned, the modulator circuit generates an RF transmission signal to be sent from the antenna (L1) (refer to FIG. 14, FIG. 15, FIG. 16, and FIG. 17).

According to the most specific embodiment, the first reception signal is in conformity with Type A of the international standard ISO/IEC 14443, the second reception signal is in conformity with Type B of the international standard ISO/IEC 14443, and the third reception signal is in conformity with the international standard ISO/IEC 18092.

(2) An IC card according to a typical embodiment of another viewpoint of the present invention includes a semiconductor integrated circuit and an antenna formed by wiring which are mounted over a substrate.

The semiconductor integrated circuit (U2) has a first antenna coupling terminal (LA), a second antenna coupling terminal (LB), a power circuit (U3), a demodulator circuit (U7), and a determination circuit (U16).

An RF signal received by an antenna (L1) is supplied between the first antenna coupling terminal and the second antenna coupling terminal. The power circuit generates operating voltage ($V_{DD}$) by rectifying and smoothing the RF signal and supplies the generated operating voltage to the demodulator circuit and the determination circuit.

The demodulator circuit (U7) includes a first demodulator circuit (U14) and a second demodulator circuit (U15). The RF signal supplied between the first antenna coupling terminal and the second antenna coupling terminal is supplied in parallel to an input of the first demodulator circuit and an input of the second demodulator circuit.

The first demodulator circuit (U14) generates a first demodulated output signal (binary signal A) by demodulating a first reception signal (Type A) which has a first degree of modulation (100%) as the RF signal.

The second demodulator circuit (U15) generates a second demodulated output signal (binary signal B) by demodulating, as the RF signal, a second reception signal (Type B) which has a second degree of modulation (10%) different from the first degree of modulation and which has a first communication start signal of a first format (SOF), and a third reception signal ("18092") which has the second degree of modulation and a second communication start signal of a second format (Preamble).

The first demodulated output signal of the first demodulator circuit (U14) and the second demodulated output signal of the second demodulator circuit (U15) are supplied to the determination circuit (U16) (refer to FIG. 1).

When the determination circuit (U16) determines that the first demodulator circuit (U14) generates the first demodulated output signal, the determination circuit (U16) determines that the first reception signal which has the first degree of modulation is currently received as the RF signal (Step F4-2, Step F4-4 in FIG. 7).

When the determination circuit (U16) determines that the first demodulator circuit (U14) does not generate the first demodulated output signal, the determination circuit determines the difference between the format of the first communication start signal and the format of the second communication start signal (Step F4-3 in FIG. 7).

When the determination circuit (U16) determines that the second demodulator circuit (U15) generates the second demodulated output signal by demodulating the second reception signal (Type B) which has the first communication start signal of the first format (SOF), the determination circuit (U16) determines that the second reception signal is currently received as the RF signal (Step F4-3, Step F4-5 in FIG. 7).

When the determination circuit (U16) determines that the second demodulator circuit (U15) generates the second demodulated output signal by demodulating the third reception signal ("18092") which has the second communication start signal of the second format (Preamble), the determination circuit (U16) determines that the third reception signal is currently received as the RF signal (Step F4-3, Step F4-6 in FIG. 7).

(3) A typical embodiment of yet another viewpoint of the present invention is related to an operation method of an IC card including a semiconductor integrated circuit and an antenna formed by wiring which are mounted over a substrate.

The semiconductor integrated circuit (U2) has a first antenna coupling terminal (LA), a second antenna coupling terminal (LB), a power circuit (U3), a demodulator circuit (U7), and a determination circuit (U16).

An RF signal received by the antenna (L1) is supplied between the first antenna coupling terminal and the second antenna coupling terminal. The power circuit generates operating voltage ($V_{DD}$) by rectifying and smoothing the RF signal and supplies the generated operating voltage to the demodulator circuit and the determination circuit.

The demodulator circuit (U7) includes a first demodulator circuit (U14) and a second demodulator circuit (U15). The RF signal supplied between the first antenna coupling terminal and the second antenna coupling terminal is supplied in parallel to an input of the first demodulator circuit and an input of the second demodulator circuit.

The first demodulator circuit (U14) generates a first demodulated output signal (binary signal A) by demodulating a first reception signal (Type A) which has a first degree of modulation (100%) as the RF signal.

The second demodulator circuit (U15) generates a second demodulated output signal (binary signal B) by demodulating, as the RF signal, a second reception signal (Type B) which has a second degree of modulation (10%) different from the first degree of modulation and which has a first communication start signal of a first format (SOF), and a third reception signal ("18092") which has the second degree of modulation and a second communication start signal of a second format (Preamble).

The first demodulated output signal of the first demodulator circuit (U14) and the second demodulated output signal of the second demodulator circuit (U15) are supplied to the determination circuit (U16) (refer to FIG. 1).

When the determination circuit (U16) determines that the first demodulator circuit (U14) generates the first demodulated output signal, the determination circuit (U16) determines that the first reception signal which has the first degree of modulation is currently received as the RF signal (Step F4-2, Step F4-4 in FIG. 7).

When the determination circuit (U16) determines that the first demodulator circuit (U14) does not generate the first demodulated output signal, the determination circuit (U16) determines the difference between the format of the first communication start signal and the format of the second communication start signal (Step F4-3 in FIG. 7).

When the determination circuit (U16) determines that the second demodulator circuit (U15) generates the second demodulated output signal by demodulating the second reception signal (Type B) which has the first communication start signal of the first format (SOF), the determination circuit (U16) determines that the second reception signal is currently received as the RF signal (Step F4-3, Step F4-5 in FIG. 7).

When the determination circuit (U16) determines that the second demodulator circuit (U15) generates the second demodulated output signal by demodulating the third reception signal ("18092") which has the second communication start signal of the second format (Preamble), the determination circuit (U16) determines that the third reception signal is currently received as the RF signal (Step F4-3, Step F4-6 in FIG. 7).

<<Explanation of embodiment>> Next, an embodiment is explained further in full detail. In all the diagrams for explaining the best mode for the embodiment of the present invention, the same symbol is attached to a component which has the same function as in the previous drawing, and the repeated explanation thereof is omitted.

<<Basic configuration of a noncontact IC card>> FIG. 1 illustrates basic configuration of a noncontact IC card according to an embodiment of the present invention.

The noncontact IC card U1 illustrated in FIG. 1 includes an antenna L1, a resonance capacity C1, and a semiconductor integrated circuit U2. One end of the antenna L1 and one end of the resonance capacity C1 are coupled to a first antenna coupling terminal LA of the semiconductor integrated circuit U2, and the other end of the antenna L1 and the other end of the resonance capacity C1 are coupled to a second antenna coupling terminal LB of the semiconductor integrated circuit U2. Therefore, an RF carrier signal from a noncontact reader/writer device can be supplied to a power circuit U3 as operation energy of the noncontact IC card U1 via the antenna coupling terminals LA and LB.

A reception signal from the noncontact reader/writer device is supplied to a demodulator circuit U7 via the antenna coupling terminals LA and LB of the noncontact IC card U1. On the other hand, a transmitting signal from a modulator circuit U8 of the noncontact IC card U1 can be supplied to the noncontact reader/writer device via the antenna coupling terminals LA, LB, the antenna L1, and the resonance capacity C1.

The semiconductor integrated circuit U2 includes the power circuit U3 and an internal circuit U4. The power circuit U3 includes a rectifier circuit U5 and a regulator U6, and the internal circuit U4 includes a demodulator circuit U7, a modulator circuit U8, and a noncontact control circuit U9. The demodulator circuit U7 includes a low sensitivity demodulator circuit U14 and a high sensitivity demodulator circuit U15. The low sensitivity demodulator circuit U14 is for receiving a reception signal of Type A of ISO/IEC 14443 from the noncontact reader/writer device. The high sensitivity demodulator circuit U15 is for receiving a reception signal of Type B of ISO/IEC 14443 and a reception signal of ISO/IEC 18092 from the noncontact reader/writer device. The noncontact control circuit U9 includes a determination circuit U16, a determination result register U17, a receiving error register U18, a receiving circuit U19, and a transmitting circuit U20. The RAM (U10), ROM (U11), CPU (U12), EEPROM (U13), a coprocessor (not shown) which performs cipher processing etc., an interface circuit (not shown), etc. are coupled to the noncontact control circuit U9 via a bus (BUS).

The noncontact IC card U1 illustrated in FIG. 1 has a function to detect which data communication method the reception signal from the noncontact reader/writer device is based on among data communication methods of the Type A of ISO/IEC 14443, the Type B of ISO/IEC 14443, and ISO/IEC 18092, from a degree of ASK modulation and the time width of a logical value.

When the noncontact IC card U1 illustrated in FIG. 1 goes into an operation field where an RF carrier signal from the noncontact reader/writer device can be received, the rectifier circuit U5 and the regulator U6 of the power circuit U3 of the noncontact IC card U1 generate internal power supply voltage $V_{DD}$ and supply the generated internal power supply voltage $V_{DD}$ to each circuit included in the internal circuit U4 as operation power voltage. First, a reception signal received at both ends of the antenna L1 is supplied to the low sensitivity demodulator circuit U14 and the high sensitivity demodulator circuit U15 of the demodulator circuit U7 during initial reception. On the other hand, the output of the low sensitivity demodulator circuit U14 and the output of the high sensitivity demodulator circuit U15 are supplied to the determination circuit U16 of the noncontact control circuit U9. The determination circuit U16 detects which data communication method of Type A, Type B, and "18092", the current reception signal is based on. First, the output of the low sensitivity demodulator circuit U14 and the output of the high sensitivity demodulator circuit U15 are supplied to the determination circuit U16 of the noncontact control circuit U9, and the degree of ASK modulation of the reception signal received during the initial reception is detected by the determination circuit U16.

As described in full detail later, the low sensitivity demodulator circuit U14 of the demodulator circuit U7 detects, during the initial reception, a reception signal of Type A of ISO/IEC 14443 which has the degree of ASK modulation of 100%. On the other hand, the high sensitivity demodulator circuit U15 of the demodulator circuit U7 detects reception signals of Type B of ISO/IEC 14443 and ISO/IEC 18092 which have the degree of ASK modulation of 10%. The determination circuit U16 of the noncontact control circuit U9 determines whether the degree of ASK modulation of the current reception signal is 100% which the low sensitivity demodulator circuit U14 detects or whether it is 10% which the high sensitivity demodulator circuit U15 detects. For example, when the determination circuit U16 determines that the degree of ASK modulation of the current reception signal is 100% of the low sensitivity demodulator circuit U14, the operation of the high sensitivity demodulator circuit U15 is halted by a low power consumption mode signal. Accordingly, power consumption due to useless operation of the high sensitivity demodulator circuit U15 during the receiving processing of the received user data after the initial reception can be reduced. On the contrary, when the determination circuit U16 determines that the degree of ASK modulation of the current reception signal is 10% of the high sensitivity demodulator circuit U15, the operation of the low sensitivity demodulator circuit U14 is halted by the low power consumption mode signal. Accordingly, power consumption due to useless operation of the low sensitivity demodulator circuit U14 during the receiving processing of the received user data after the initial reception can be reduced.

<<Detection of the degree of ASK modulation>> FIG. 2(A) and FIG. 2(B) illustrate waveforms of a reception signal in the noncontact IC card, received from the noncontact reader/writer device. FIG. 2(A) is for the case where the degree of ASK modulation is 100% in Type A of ISO/IEC 14443, and FIG. 2(B) is for the case where the degree of ASK modulation is 10% in Type B of ISO/IEC 14443 and ISO/IEC 18092. That is, FIG. 2(A) illustrates the waveform of a reception signal in the case where the degree of ASK modulation is 100% in Type A of ISO/IEC 14443. FIG. 2(B) illustrates the waveform of a reception signal in the case where the degree of ASK modulation is 10% in Type B of ISO/IEC 14443 and ISO/IEC 18092. Assuming the minimum amplitude value of "a" and the maximum amplitude value of "b" for a reception signal which is amplitude-modulated, the degree of ASK modulation is given by $|b-a|/|b+a|$.

The demodulator circuit U7 of the internal circuit U4 of the noncontact IC card U1 illustrated in FIG. 1 includes the low sensitivity demodulator circuit U14 and the high sensitivity demodulator circuit U15. For example, the low sensitivity demodulator circuit U14 has such a low detection sensitivity that the amplitude difference is not detectable if the amplitude difference between the minimum amplitude value "a" and the maximum amplitude value "b" is not greater than or equal to 90%. The high sensitivity demodulator circuit U15 has such a high detection sensitivity that the amplitude difference is detectable if the amplitude difference of the minimum amplitude value "a" and the maximum amplitude value "b" is greater than or equal to 18%.

The reception signal across both ends of the antenna L1 is supplied to a difference input terminal of the low sensitivity demodulator circuit U14 and a difference input terminal of the high sensitivity demodulator circuit U15 of the demodulator circuit U7 of FIG. 1. A binary signal A is generated from the output of the low sensitivity demodulator circuit U14, and a binary signal B is generated from the output of the high sensitivity demodulator circuit U15.

The binary signal A of the output of the low sensitivity demodulator circuit U14 with a low detection sensitivity and the binary signal B of the output of the high sensitivity demodulator circuit U15 with a high detection sensitivity are illustrated in the lower part of FIG. 2(A), wherein the low sensitivity demodulator circuit U14 and the high sensitivity demodulator circuit U15 respond to the reception signal of Type A of ISO/IEC 14443. In this case, the waveforms of both outputs become the same.

The binary signal A of the output of the low sensitivity demodulator circuit U14 with a low detection sensitivity and the binary signal B of the output of the high sensitivity demodulator circuit U15 with a high detection sensitivity are illustrated in the lower part of FIG. 2(B), wherein the low sensitivity demodulator circuit U14 and the high sensitivity demodulator circuit U15 respond to the reception signal of Type B of ISO/IEC 14443 or ISO/IEC 18092. In this case, from the binary signal B of the output of the high sensitivity demodulator circuit U15 with a high detection sensitivity, the detection signal to the reception signals of Type B of ISO/IEC 14443 and ISO/IEC 18092 having a degree of ASK modulation of 10% is generated. However, from the output binary signal A of the low sensitivity demodulator circuit U14 with a low detection sensitivity, the detection signal to the reception signals of Type B of ISO/IEC 14443 and ISO/IEC 18092 having a degree of ASK modulation of 10% is not generated.

<<Detection of a data communication method>> First, the data sent from the noncontact reader/writer device to the noncontact IC card U1 is defined as "downlink data", and the data sent from the noncontact IC card U1 to the noncontact reader/writer device is defined as "uplink data."

FIG. 7 is a flowchart for explaining an operation flow of the noncontact IC card U1 of FIG. 1 in the case where the noncontact IC card detects which data communication method of Type A, Type B, and "18092" a reception signal from a noncontact reader/writer device is based on.

At Step F1 of FIG. 7, when the noncontact IC card U1 illustrated in FIG. 1 goes into the operation field of the noncontact reader/writer device, the power circuit U3 of the noncontact IC card U1 generates internal power supply voltage $V_{DD}$, and supplies it to the internal circuit U4 as operation power voltage.

Next, at Step F2 of FIG. 7, the CPU (U12) reads the contents of the determination result register U17 inside the noncontact control circuit U9 via the bus (BUS). When determination of a data communication method and a data communication speed is executed in advance, the information on the determination result of the data communication method and the data communication speed which have been determined by the determination circuit U16 are stored in the determination result register U17. In the present case, the determination is not executed in advance and no determination result is stored in the determination result register U17; therefore, the state of the noncontact IC card U1 shifts to the initial receiving mode at Step F4 of FIG. 7. Then, in an initial receiving period at Step F4-1 of FIG. 7, parallel demodulation operations by the low sensitivity demodulator circuit U14 and the high sensitivity demodulator circuit U15 in the demodulator circuit U7 of the noncontact IC card U1 are executed. The binary signal A of the output of the low sensitivity demodulator circuit U14 with a low detection sensitivity and the binary signal B of the output of the high sensitivity demodulator circuit U15 with a high detection sensitivity are supplied to the determination circuit U16.

As explained in the lower part of FIG. 2(A), in receiving the reception signal of Type A of ISO/IEC 14443, the waveform of the binary signal A of the output of the low sensitivity demodulator circuit U14 and the waveform of the binary signal B of the output of the high sensitivity demodulator circuit U15 become the same. Accordingly, as indicated in the result on the left-hand side of Step F4-2 of FIG. 7 and in the method determination at Step F4-4, the determination circuit U16 can determine that the reception signal of Type A of ISO/IEC 14443 with the degree of ASK modulation of 100% is currently received, based on the fact that the binary signal A and the binary signal B have the same waveform. Subsequently, at Step F4-7 of FIG. 7, the determination circuit U16 writes the determination result of the current reception of Type A into the determination result register U17. Then, at Step F4-10 of FIG. 7, receiving processing of the received user data of Type A is performed. Since the data communication method from the noncontact reader/writer device to the noncontact IC card U1 is determined at this time to be Type A of ISO/IEC 14443, the portion of the received user data of the binary signal to which serial/parallel conversion has been performed in the receiving circuit U19 is transferred and stored in the RAM (U10) in the mode of received parallel data. The received parallel data is supplied for every byte from the receiving circuit U19 to the RAM (U10) via an exclusive signal line, independently of the CPU (U12) which is set in a low power consumption state. The data transferred is stored in the RAM (U10) sequentially from, for example, the fixed address (for example, the leading address of the memory space of RAM). Accordingly, it is possible to suppress the circuit scale related to the data transfer control.

After completing reception at Step F5, the CPU (U12) returns to an operating state from the low power consumption state. Then, the CPU (U12) processes, for example, data stored in the RAM (U10) according to a processing program for secure electronic banking stored in the ROM (U11) or the EEPROM (U13), and stores the processed result in the RAM (U10) again. The processed result stored in the RAM (U10) is transferred to a transmitting circuit U20 of the noncontact control circuit U9 as transmitting parallel data, and is converted into a frame of ISO/IEC 14443 in the transmitting circuit U20. A binary signal C of serial data is sent to the noncontact reader/writer device via the modulator circuit U8.

When a certain receiving error occurs in the receiving processing at Step F4-10 of FIG. 7, the receiving circuit U19 writes the result of the receiving error in the receiving error register U18 at Step F4-13 of FIG. 7. The reception ends at Step F5 of FIG. 7. When a receiving error does not occur in the reception at Step F4-10 of FIG. 7 and the reception is performed normally, a setup of the receiving error register at Step F4-13 becomes unnecessary, and the flow moves to the end of receiving operation at Step F5.

As explained in the lower part of FIG. 2(B), when the reception signal of Type B of ISO/IEC 14443 or ISO/IEC 18092 is received, a detection signal for the reception signal of Type B of ISO/IEC 14443 or ISO/IEC 18092 with the degree of ASK modulation of 10% can be generated as a binary signal B changing between a high level and a low level, from the output of the high sensitivity demodulator circuit U15. In this case, however, from the output of the low sensitivity demodulator circuit U14, a binary signal A changing between a high level and a low level is not generated. Accordingly, as indicated in the result on the right-hand side of Step F4-2 of FIG. 7, the determination circuit U16 can determine that the reception signal of Type B of ISO/IEC 14443 or ISO/IEC 18092 with the degree of ASK modulation of 10% is currently received, from the difference in waveforms of the binary signal A and the binary signal B.

<<Pulse width determination of a binary signal>> It is possible to determine by the pulse width determination of the binary signal B at Step F4-3 of FIG. 7 performed by the determination circuit U16 whether the reception signal received currently is Type B of ISO/IEC 14443 or whether it is ISO/IEC 18092.

As described in Non-patent Document 2, SOF (Start Of Frame) including the logic "0" of predetermined length is added to the top of a frame as the transmitting data of Type B of ISO/IEC 14443 to be transmitted from the noncontact reader/writer device to the noncontact IC card U1.

FIG. 3 illustrates frame structure of transmitting data of Type B of ISO/IEC 14443. As illustrated in FIG. 3, at the top of the frame, SOF (Start Of Frame) as a communication start signal is included. In the middle of the frame, character (Character) as transfer user data is included. A cyclic redundancy check error detection code (CRC) and EOF (End Of Frame) as a communication end signal are added following the transfer user data.

In contrast to it, as described in Non-patent Document 3, a preamble (Preamble) including encoded logic "0" of a minimum of 48 bits as a communication start signal is added to the top of a transmission data packet of ISO/IEC 18092 transmitted from the noncontact reader/writer device to the noncontact IC card U1.

FIG. 4 illustrates structure of a transmission data packet of ISO/IEC 18092. As illustrated in FIG. 4, the transmission data packet includes, from the top, a preamble (Preamble), a synchronization code, data length (LEN), payload data (PD0, PD1 - - - PDn), and a cyclic redundancy check error detection code (CRC).

Figure 5:
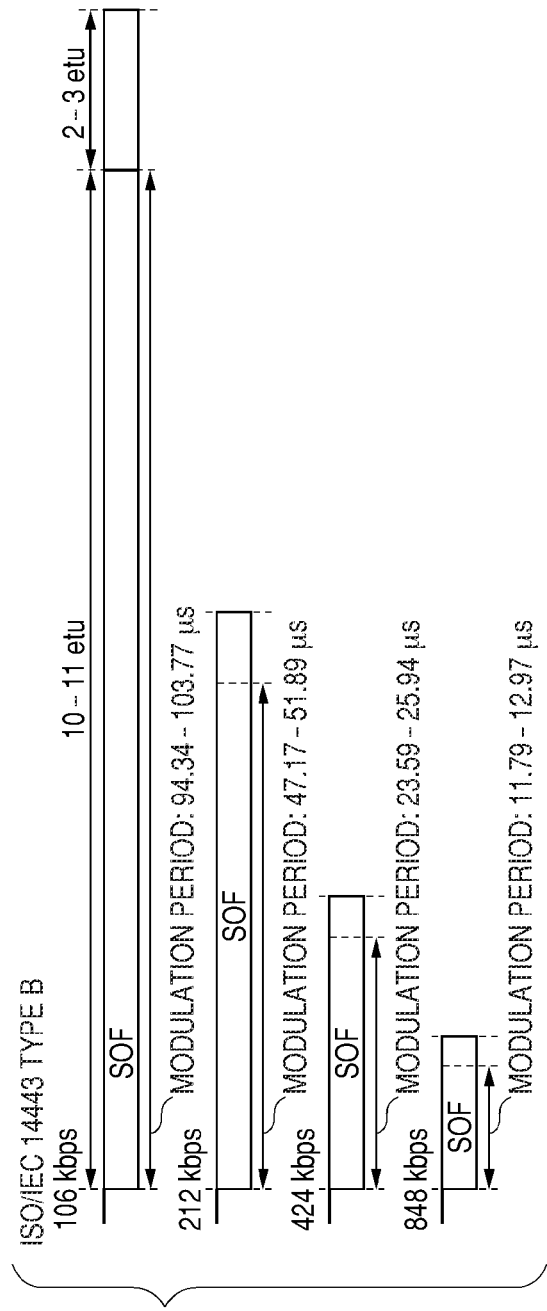
FIG. 5 is a drawing illustrating temporal length of a communication start signal SOF at the top of a frame, in the case where the transmission speeds of the transmitting data of Type B of ISO/IEC 14443 transmitted from a noncontact reader/writer device to a noncontact IC card are 106 kbps, 212 kbps, 424 kbps, and 848 kbps, respectively.

FIG. 5 illustrates temporal length of a communication start signal SOF at the top of a frame, in the case where the transmission speeds of the transmitting data of Type B of ISO/IEC 14443 transmitted from the noncontact reader/writer device to the noncontact IC card U1 are 106 kbps, 212 kbps, 424 kbps, and 848 kbps, respectively. As described in Non-patent Document 2, SOF of Type B of ISO/IEC 14443 includes the logic "0" of 10-11 etu and the logic "1" of 2-3 etu. Accordingly, when the transmission speed is a comparatively low speed of 212 kbps, the modulation period (modulation time) of the logic "0" of 10-11 etu becomes 47.17-51.89 μsec. When the transmission speed is a high-speed of 848 kbps, the modulation period of the logic "0" of 10-11 etu becomes 11.79-12.97 μsec. Here, "etu" stands for "elementary time unit."

Figure 6:
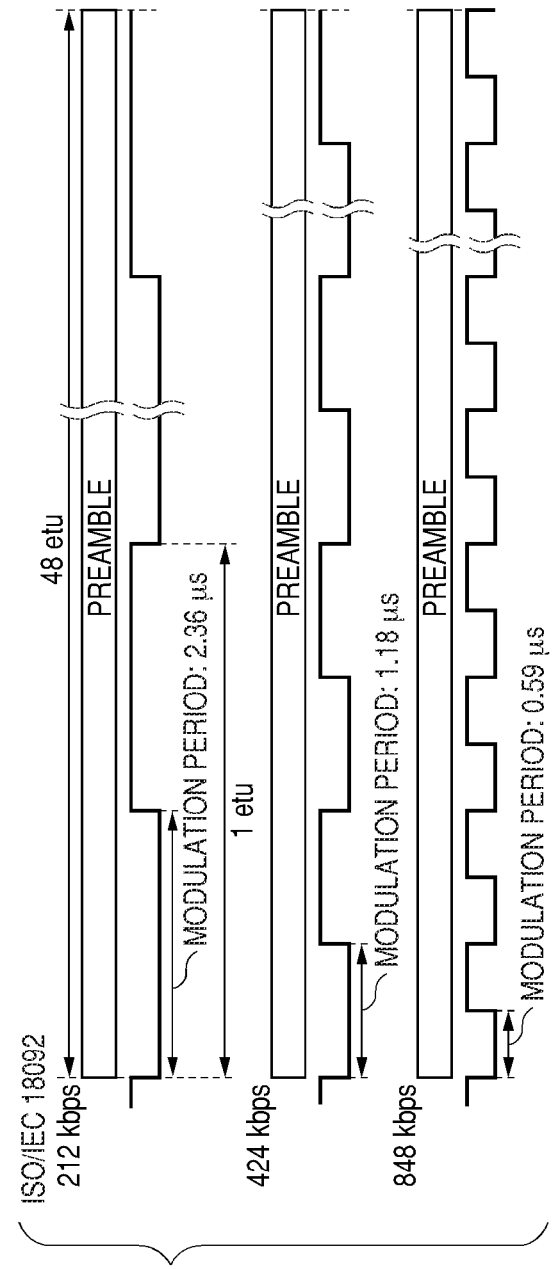
FIG. 6 is a drawing illustrating temporal length of the logic "0" of a preamble at the top of a transmission data packet, in the case where the transmission speeds of the transmitting data of ISO/IEC 18092 transmitted from a noncontact reader/writer device to a noncontact IC card are 212 kbps, 424 kbps, and 848 kbps, respectively.

FIG. 6 illustrates temporal length of the logic "0" of a preamble (Preamble) at the top of a transmission data packet, in the case where the transmission speeds of the transmitting data of ISO/IEC 18092 transmitted from a noncontact reader/writer device to a noncontact IC card U1 are 212 kbps, 424 kbps, and 848 kbps, respectively. As described in Non-patent Document 3, the preamble of ISO/IEC 18092 includes the encoded logic "0" of a minimum of 48 bits. Accordingly, when the transmission speed is a comparatively low speed of 212 kbps, the modulation period of the logic "0" at the beginning of the preamble becomes 2.36 μsec, and when the transmission speed is a high-speed of 848 kbps, the modulation period of the logic "0" at the beginning of the preamble becomes 0.59 μsec.

Therefore, when compared with the modulation period of 47.17-51.89 μsec of the logic "0" in SOF of the transmitting data of Type B of ISO/IEC 14443 at the transmission speed of comparatively low-speed of 212 kbps, the modulation period of 2.36 μsec of the logic "0" at the beginning of the preamble of the transmitting data of ISO/IEC 18092 at the same transmission speed turns out to be a very short time. The determination circuit U16 determines the difference of the pulse width of this logic "0" by the pulse width determination of the binary signal B at Step F4-3 of FIG. 7. Accordingly, it is possible to determine whether the reception signal currently received is Type B of ISO/IEC 14443 or whether it is ISO/IEC 18092.

Therefore, when, by the pulse width determination of the binary signal B at Step F4-3 of FIG. 7, it is determined that the modulation period of the logic "0" is long at the transmission speed of, for example, a comparatively low-speed of 212 kbps at that time, the determination circuit U16 can determine the transmission speed and the fact that the reception signal of Type B of ISO/IEC 14443 is currently received, as illustrated in the result on the left-hand side at Step F4-3 and at Step F4-5. Subsequently, at Step F4-8 of FIG. 7, the determination circuit U16 writes the determination result of the current reception of Type B, into the determination result register U17. Then, at Step F4-11 of FIG. 7, receiving processing of the received user data of Type B is performed. Since the data communication method from the noncontact reader/writer device to the noncontact IC card U1 is determined at this time to be Type B of ISO/IEC 14443, the portion of the received user data of the binary signal to which serial/parallel conversion has been performed in the receiving circuit U19 is transferred and stored in the RAM (U10). The received parallel data is supplied for every byte from the receiving circuit U19 to the RAM (U10) via an exclusive signal line, independently of the CPU (U12) which is set in a low power consumption state. The data transferred is stored in the RAM (U10) sequentially from, for example, the fixed address (for example, the leading address of the memory space of the RAM). Accordingly, it is possible to suppress the circuit scale related to the data transfer control.

The CPU (U12) processes, for example, data stored in the RAM (U10) according to a processing program for secure electronic banking stored in the ROM (U11) or the EEPROM (U13), and stores the processed result in the RAM (U10) again. The processed result stored in the RAM (U10) is transferred to a transmitting circuit U20 of the noncontact control circuit U9 as transmitting parallel data, and is converted into a frame of ISO/IEC 14443 in the transmitting circuit U20. A binary signal C of serial data is sent to the noncontact reader/writer device via the modulator circuit U8.

When a certain receiving error occurs in the receiving processing at Step F4-11 of FIG. 7, the receiving circuit U19 writes the result of the receiving error in the receiving error register U18 at Step F4-14 of FIG. 7. Then, the reception ends at Step F5 of FIG. 7. When a receiving error does not occur in the reception at Step F4-11 of FIG. 7 and the reception is performed normally, a setup of the receiving error register at Step F4-14 becomes unnecessary, and the flow moves to the end of receiving operation at Step F5.

Therefore, when, by the pulse width determination of the binary signal B at Step F4-3 of FIG. 7, it is determined that the modulation period of the logic "0" is short at the transmission speed of, for example, a comparatively low-speed of 212 kbps at that time, the determination circuit U16 can determine the transmission speed and the fact that the reception signal of Type B of ISO/IEC 18092 is currently received, as illustrated in the result on the down side at Step F4-3 and at Step F4-6. Subsequently, at Step F4-9 of FIG. 7, the determination circuit U16 writes the determination result of the current reception of "18092", into the determination result register U17. Then, at Step F4-12 of FIG. 7, receiving processing of the received user data of "18092" is performed. The data communication method from the noncontact reader/writer device to the noncontact IC card U1 is determined at this time to be "18092." Therefore, the portion of the received user data of the binary signal to which serial/parallel conversion has been performed in the receiving circuit U19 is transferred and stored in the RAM (U10). The received parallel data is supplied for every byte from the receiving circuit U19 to the RAM (U10) via an exclusive signal line, independently of the CPU (U12) which is set in a low power consumption state. The data transferred is stored in the RAM (U10) sequentially from, for example, the fixed address (for example, the leading address of the memory space of the RAM). Accordingly, it is possible to suppress the circuit scale related to the data transfer control.

The CPU (U12) processes, for example, data stored in the RAM (U10) according to a processing program for secure electronic banking stored in the ROM (U11) or the EEPROM (U13), and stores the processed result in the RAM (U10) again. The processed result stored in the RAM (U10) is transferred to a transmitting circuit U20 of the noncontact control circuit U9 as transmitting parallel data, and is converted into a frame of ISO/IEC 18092 in the transmitting circuit U20. A binary signal C of serial data is sent to the noncontact reader/writer device via the modulator circuit U8.

When a certain receiving error occurs in the receiving processing at Step F4-12 of FIG. 7, the receiving circuit U19 writes the result of the receiving error in the receiving error register U18 at Step F4-15 of FIG. 7. Then, the reception ends at Step F5 of FIG. 7. When a receiving error does not occur in the reception at Step F4-12 of FIG. 7 and the reception is performed normally, a setup of the receiving error register at Step F4-15 becomes unnecessary, and the flow moves to the end of receiving operation at Step F5.

Furthermore, when, by the pulse width determination of the binary signal B at Step F4-3 of FIG. 7, it is determined that the modulation period of the logic "0" at the transmission speed of 212 kbps is out of the setup time range specified by Type B or "18092", the determination circuit U16 executes the processing which restores the operating state of the noncontact IC card U1 to Step F4-2.

<<Receiving operation after initial reception, processing after receiving error occurs or after modulation period falls outside setting range>> When a receiving error occurs at Step F4-13, Step F4-14, or Step F4-15 of FIG. 7, the error information is written in the receiving error register U18, and the flow moves to the end of reception. Then, the CPU (U12) reads the contents of the receiving error register U18. Since the contents read includes the receiving error, the CPU (U12) clears the contents stored in the receiving error register U18, and the contents stored in the determination result register U17. Then, the CPU (U12) executes the processing which restores the operating state of the noncontact IC card U1 to Step F2 of FIG. 7, i.e., Step F4 of FIG. 8. After the pulse width determination at Step F4-3 of FIG. 7 determines that the modulation period of the logic "0" is out of the setup time range, the noncontact control circuit U9 executes the processing which restores the operating state of the noncontact IC card U1 to Step F4-1 of FIG. 7.

Figure 8:
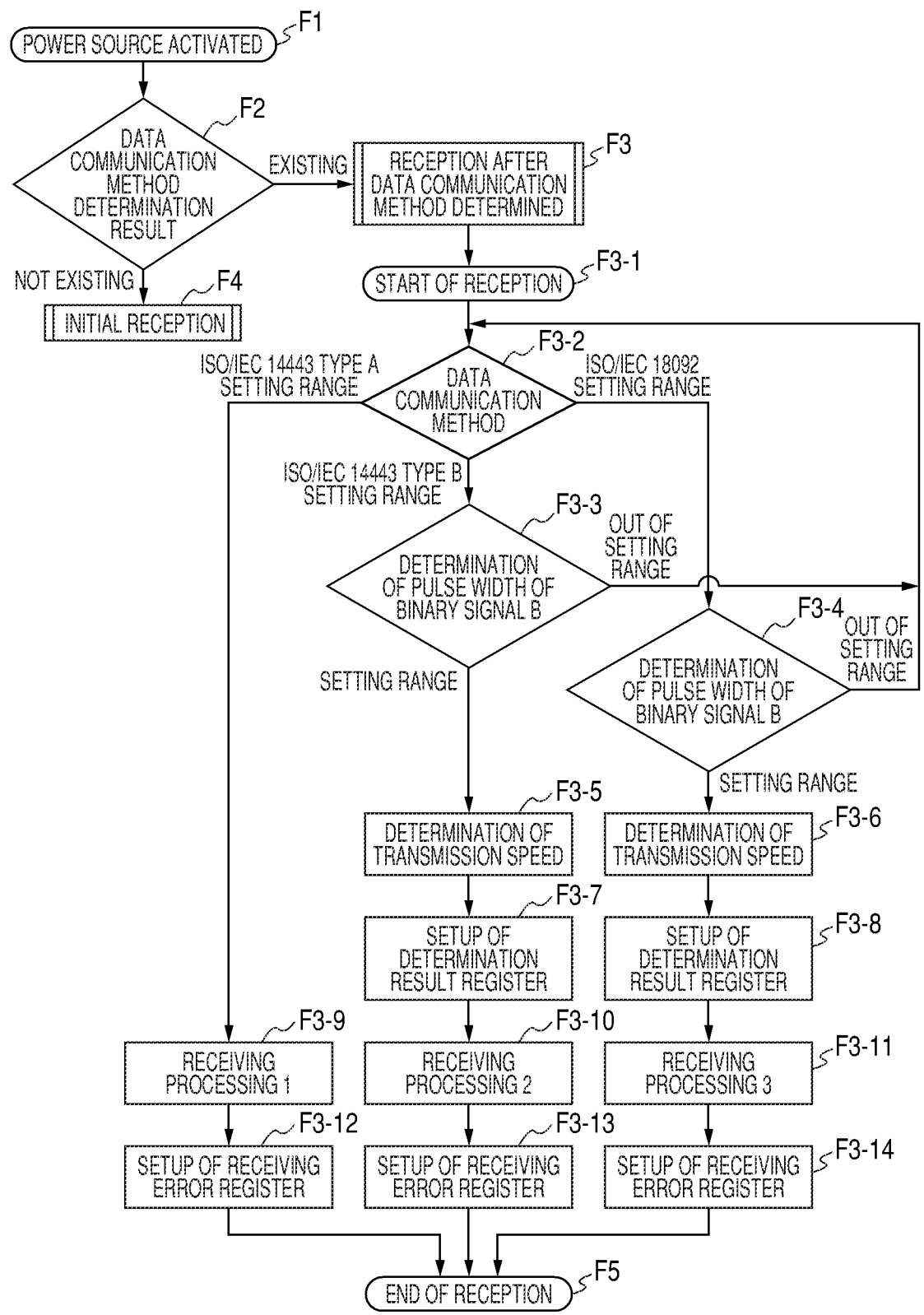
FIG. 8 is a flowchart for explaining an operation flow of the noncontact IC card of FIG. 1 in the case where the noncontact IC card has no receiving error in an initial reception, a determination result of a data communication method is stored in a determination result register, and determining of the data communication method in the reception after the initial reception is omitted.

FIG. 8 is a flowchart for explaining an operation flow of the noncontact IC card U1 of FIG. 1 in the case where the noncontact IC card U1 has no receiving error in an initial reception, a determination result of a data communication method is stored in a determination result register U17, and determining of the data communication method in the reception after the initial reception is omitted.

In the operation flow of FIG. 7, when there is no receiving error and the determination result of the data communication method is stored in the determination result register U17, the initial reception is completed. Then, since the determination result of the former data communication method is stored in the determination result register U17 of the noncontact control circuit U9, the operating state of the noncontact IC card U1 shifts to the data-communication-method-confirmed reception mode at Step F3 of FIG. 8, and also the receiving processing at Step F3-1 of FIG. 8 is started. The data communication method determined by the initial reception is one of Type A, Type B, and "18092". Therefore, the determination circuit U16 determines the data communication method determined at the initial reception from the determination result register U17 at Step F3-2 of FIG. 8. When the determination result register U17 stores the determination result indicating that the data communication method determined in the initial reception is Type A of ISO/IEC 14443, the receiving processing of Type A of ISO/IEC 14443 which is the same method as before is executed in the receiving processing at Step F3-9 of FIG. 8. When a certain receiving error occurs in the receiving processing at Step F3-9 of FIG. 8, the receiving circuit U19 writes the result of the receiving error in the receiving error register U18 at Step F3-12 of FIG. 8, and the flow moves to the end of reception at Step F5 of FIG. 8.

However, at Step F3-2 of FIG. 8, when the data communication method determined at the initial reception is found, from the determination result register U17, to be Type B of ISO/IEC 14443 or ISO/IEC 18092, the pulse width determination of the binary signal B is executed at Step F3-3 and Step F3-4 of FIG. 8.

Namely, when the transmission speed is so determined by the pulse width determination of the binary signal B by the determination circuit U16 at Step F3-3 of FIG. 8 that the reception signal of Type B of ISO/IEC 14443 is currently received, the determination circuit U16 determines the transmission speed at Step F3-5 of FIG. 8, and writes the determination result of the reception of Type B in the determination result register U17 at Step F3-7. Then, at Step F3-10 of FIG. 8, receiving processing of the received user data of Type B is performed similarly as at Step F4-11 of FIG. 7. When a certain receiving error is in the receiving processing at Step F3-10 of FIG. 8, the receiving circuit U19 writes the result of the receiving error in the receiving error register U18 at Step F3-13 of FIG. 8. Then, the reception ends at Step F5 of FIG. 8.

When the transmission speed is determined by the pulse width determination of the binary signal B by the determination circuit U16 at Step F3-4 of FIG. 8 so that the reception signal of ISO/IEC 18092 is currently received, the determination circuit U16 determines the transmission speed at Step F3-6 of FIG. 8, and writes the determination result of the reception of "18092" in the determination result register U17 at Step F3-8. Then, at Step F3-11 of FIG. 8, receiving processing of the received user data of "18092" is performed similarly as at Step F4-12 of FIG. 7. When a certain receiving error is in the receiving processing at Step F3-11 of FIG. 8, the receiving circuit U19 writes the result of the receiving error in the receiving error register U18 at Step F3-14 of FIG. 8. Then, the reception ends at Step F5 of FIG. 8.

Assume that, through the pulse width determination of the binary signal B at Step F3-3 and Step F3-4 of FIG. 8, the modulation period of the logic "0" is determined to be out of the setup time range specified by Type B or "18092". Namely, in the case of a different transmission speed from the transmission speed defined by the specified setup time, the determination circuit U16 executes the processing which restores the operating state of the noncontact IC card U1 to Step F3-2. As a result, at Step F3-3 or Step F3-4 of FIG. 8, this time, the modulation period of the logic "0" is determined by the pulse width determination of the binary signal B to be within the range of the setup time specified by Type B or "18092". Then, the determination circuit U16 determines the transmission speed at Step F3-5 or Step F3-6. The determination result of the transmission speed and the determination result of the reception of Type B or "18092" are written in the determination result register U17 at Step F3-7 or Step F3-8, respectively. Afterward, the received user data of Type B or "18092" is received at Step F3-10 or Step F3-11 of FIG. 8. When a certain receiving error occurs in the present reception, the receiving circuit U19 writes the result of the receiving error in the receiving error register U18 at Step F3-13 or Step F3-14 of FIG. 8, and the flow moves to the end of reception at Step F5 of FIG. 8.

As explained above, in the noncontact IC card U1 illustrated in FIG. 1 controlled by the operation flow of FIG. 7 and the operation flow of FIG. 8, once the data communication method of Type A, Type B, or "18092" is determined, the determination result stored in the determination result register U17 is held, until the RF carrier signal from the noncontact reader/writer device is stopped by the movement of the noncontact IC card U1 to the exterior of the operation field, or until the determination result stored in the determination result register U17 is cleared by the CPU (U12).

Figure 18:
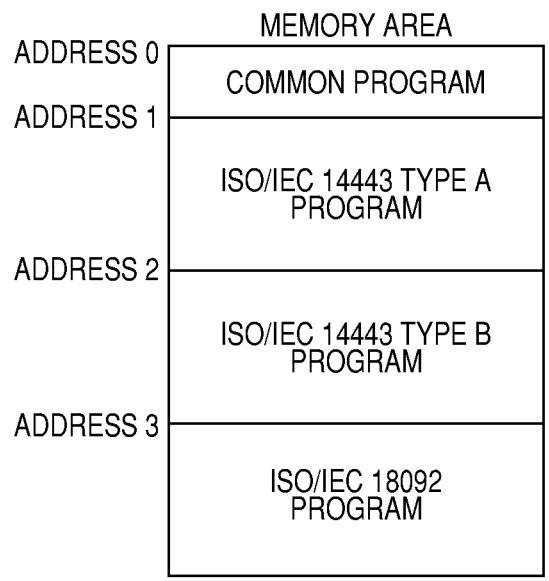
FIG. 18 is a drawing illustrating structure of the various programs which are stored in nonvolatile memories, such as a ROM (U10) or an EEPROM (U13) of the noncontact IC card U1 illustrated in FIG. 1, and which are executed by the noncontact IC card U1.

After the end of reception at Step F5 after Step F4-13, Step F4-14, or Step F4-15 of FIG. 7, or after the end of reception at Step F5 after Step F3-12, Step F3-13, or Step F3-14 of FIG. 8, the common program stored in Address 0 of the memory area illustrated in FIG. 18 is executed.

FIG. 18 illustrates structure of the various programs which are stored in nonvolatile memories, such as the ROM (U11) or the EEPROM (U13) of the noncontact IC card U1 illustrated in FIG. 1, and which are executed by the noncontact IC card U1.

In Address 0, Address 1, Address 2, and Address 3 of the memory area of the nonvolatile memory illustrated in FIG. 18, the common program, the program for Type A of ISO/IEC 14443, the program for Type B of ISO/IEC 14443, and the program for ISO/IEC 18092 are stored, respectively.

Figure 9:
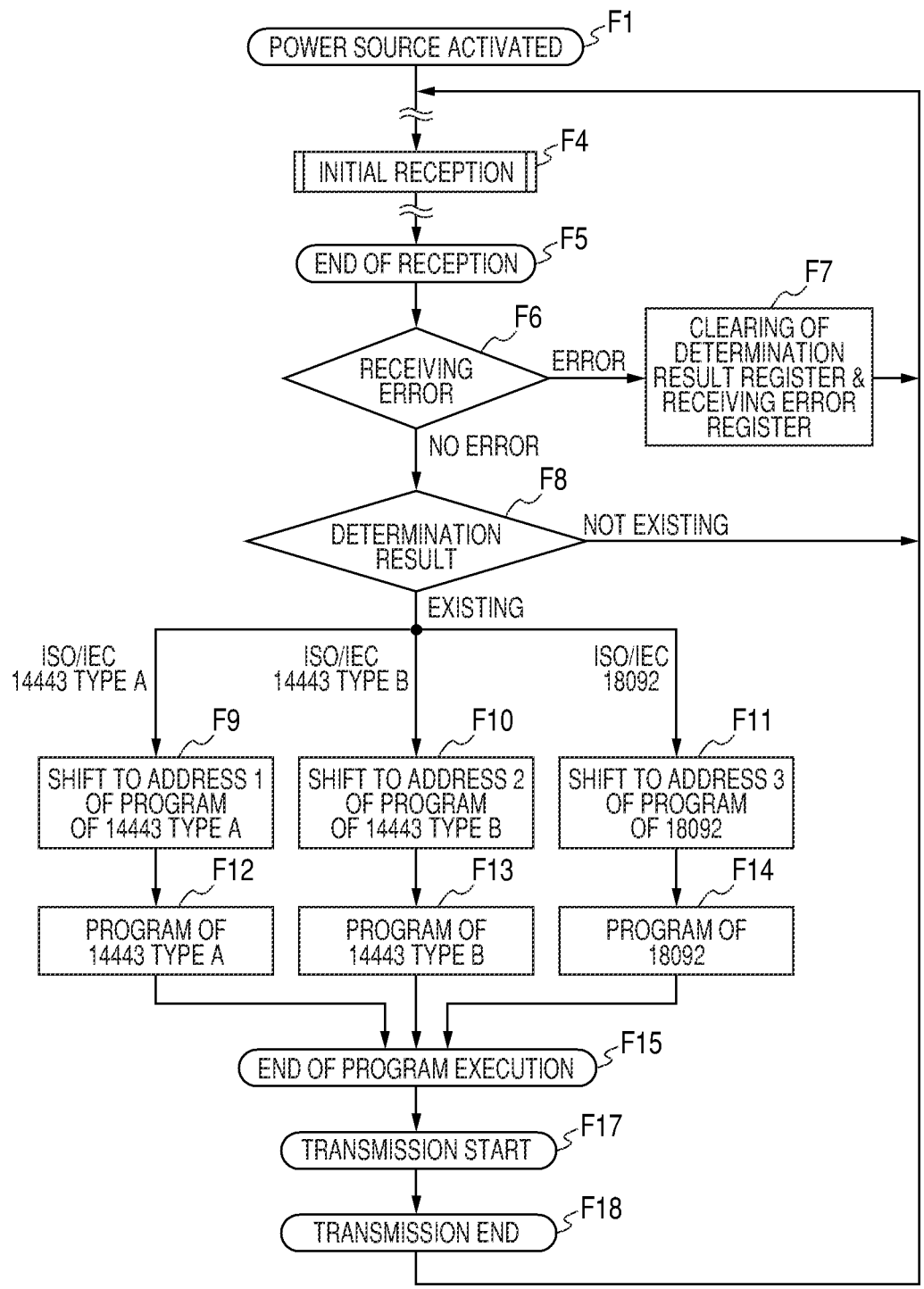
FIG. 9 is a flowchart for explaining an operation flow of the noncontact IC card of FIG. 1 after the noncontact IC card executes the operations from the initial reception at Step F4 to the end of reception at Step F5 due to receiving error, in the operation flow of FIG. 7.

By the CPU (U12) executing the common program stored in Address 0 of the memory area of the nonvolatile memory of FIG. 18, the CPU (U12) reads the contents of the receiving error register U18 at Step F6 of FIG. 9, and confirms whether there is any receiving error.

FIG. 9 is a flowchart for explaining an operation flow of the noncontact IC card U1 of FIG. 1 after the noncontact IC card executes the operations from the initial reception at Step F4 to the end of reception at Step F5 due to receiving error in the operation flow of FIG. 7.

After the end of reception due to the receiving error at Step F5 of FIG. 9, the CPU (U12) reads the contents of the receiving error register U18 at Step F6, and confirms whether there is any receiving error. When there is a receiving error, the contents stored in the receiving error register U18 and the contents stored in the determination result register U17 are cleared at Step F7 of FIG. 9, then, the initial reception at Step F4 and the start of reception at Step F4-1 are executed again.

Since the receiving error at Step F6 of FIG. 9 can be eliminated by repeating the similar processing, the CPU (U12) reads the contents stored in the determination result register U17 at Step F8 of FIG. 9, and the CPU (U12) confirms which data communication method of Type A, Type B, or "18092" is stored. When none of the results of the data communication methods is stored in the determination result register U17, the initial reception at Step F4 and the start of reception at Step F4-1 are executed. When the result of one of the data communication methods is stored in the determination result register U17, as illustrated at Step F9, Step F10, and Step F11 of FIG. 9, the flow shifts to one of Address 1 for executing the program of Type A, Address 2 for executing the program of Type B, and Address 3 for executing the program of "18092" of the memory area illustrated in FIG. 18. Therefore, the same program which is executed at the time of occurrence of receiving error in one of the program of "Type A", the program of "Type B", and the program of "18092" is executed, as illustrated at Step F12, Step F13, and Step F14 of FIG. 9.

When the program execution is completed at Step F15, the transmitting operation is executed according to the data communication method for one of Type A, Type B, and "18092" which has been stored in the determination result register U17 at Step F17. The transmitting operation is completed at Step F18. When the transmitting data from the noncontact reader/writer device is received again, the operation flow of FIG. 9 is performed and necessary data transmission and reception are repeated.

Figure 10:
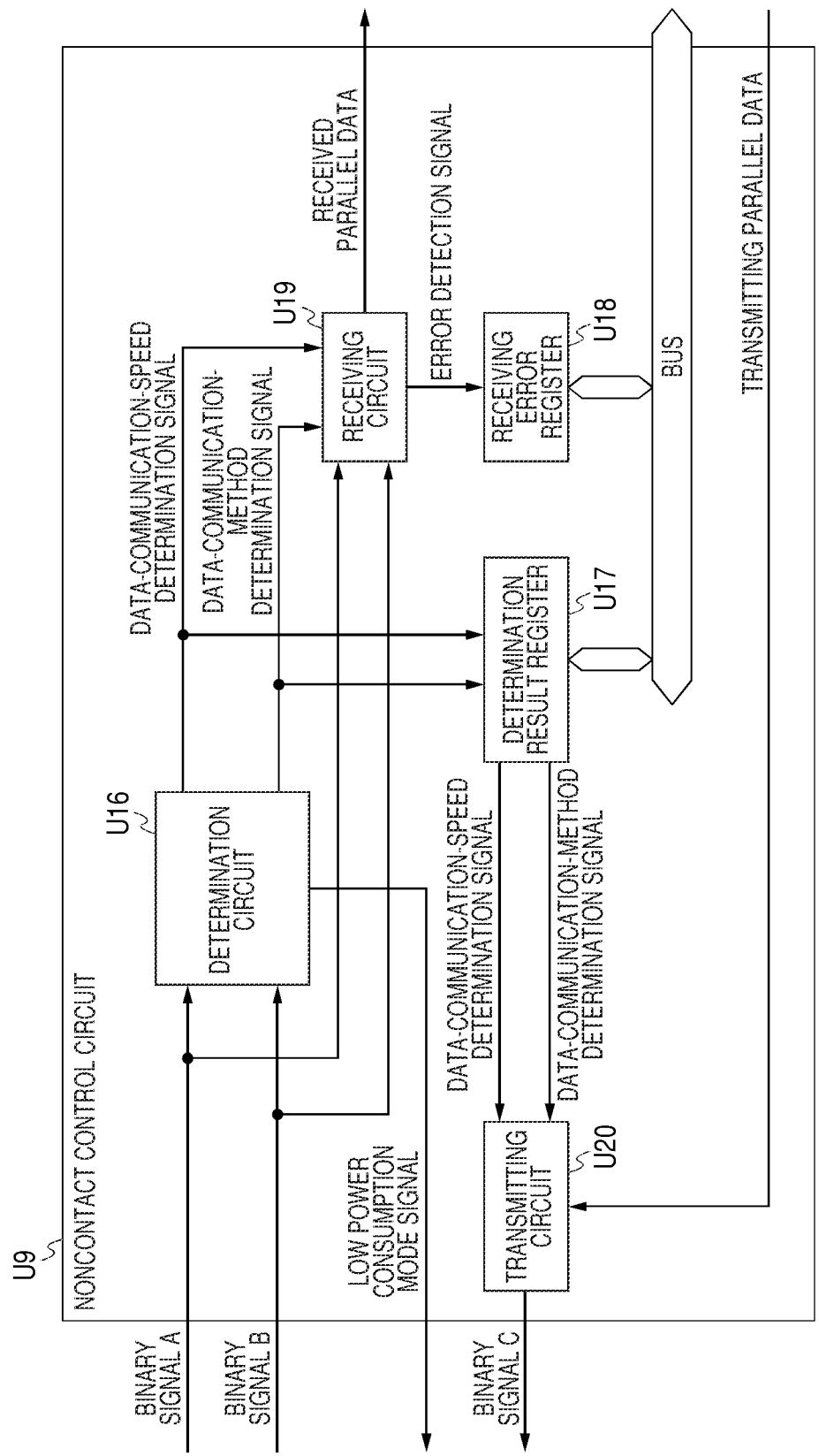
FIG. 10 is a drawing illustrating configuration of a noncontact control circuit included in an internal circuit of the semiconductor integrated circuit of the noncontact IC card illustrated in FIG. 1.

<<Detailed configuration of a noncontact IC card>>
<<Configuration of a noncontact control circuit>> FIG. 10 illustrates the configuration of the noncontact control circuit U9 included in the internal circuit U4 of the semiconductor integrated circuit U2 of the noncontact IC card U1 illustrated in FIG. 1.

The noncontact control circuit U9 illustrated in FIG. 10 includes the determination circuit U16, the determination result register U17, the receiving error register U18, the receiving circuit U19, the transmitting circuit U20, and the bus (BUS). As shown in FIG. 1, to the determination circuit U16, a binary signal A from the low sensitivity demodulator circuit U14 of the demodulator circuit U7 and a binary signal B from the high sensitivity demodulator circuit U15 of the demodulator circuit U7 are supplied. A low power consumption mode signal is supplied from the determination circuit U16 to the demodulator circuit U7. To the receiving circuit U19, the binary signal A from the low sensitivity demodulator circuit U14 of the demodulator circuit U7, the binary signal B from the high sensitivity demodulator circuit U15 of the demodulator circuit U7, and the data-communication-speed determination signal and the data-communication-method determination signal from the determination circuit U16 are supplied. Received parallel data is transferred from the receiving circuit U19 to the RAM (U10), and an error detection signal is supplied from the receiving circuit U19 to the receiving error register (U18). To the determination result register (U17), the data-communication-speed determination signal and the data-communication-method determination signal are supplied from the determination circuit U16. To the transmitting circuit (U20), the data-communication-speed determination signal and the data-communication-method determination signal are supplied from the determination result register (U17). Transmitting parallel data is transferred from the RAM (U10) to the transmitting circuit (U20), and a binary signal C is supplied from the transmitting circuit (U20) to the modulator circuit U8 of FIG. 1.

Figure 11:
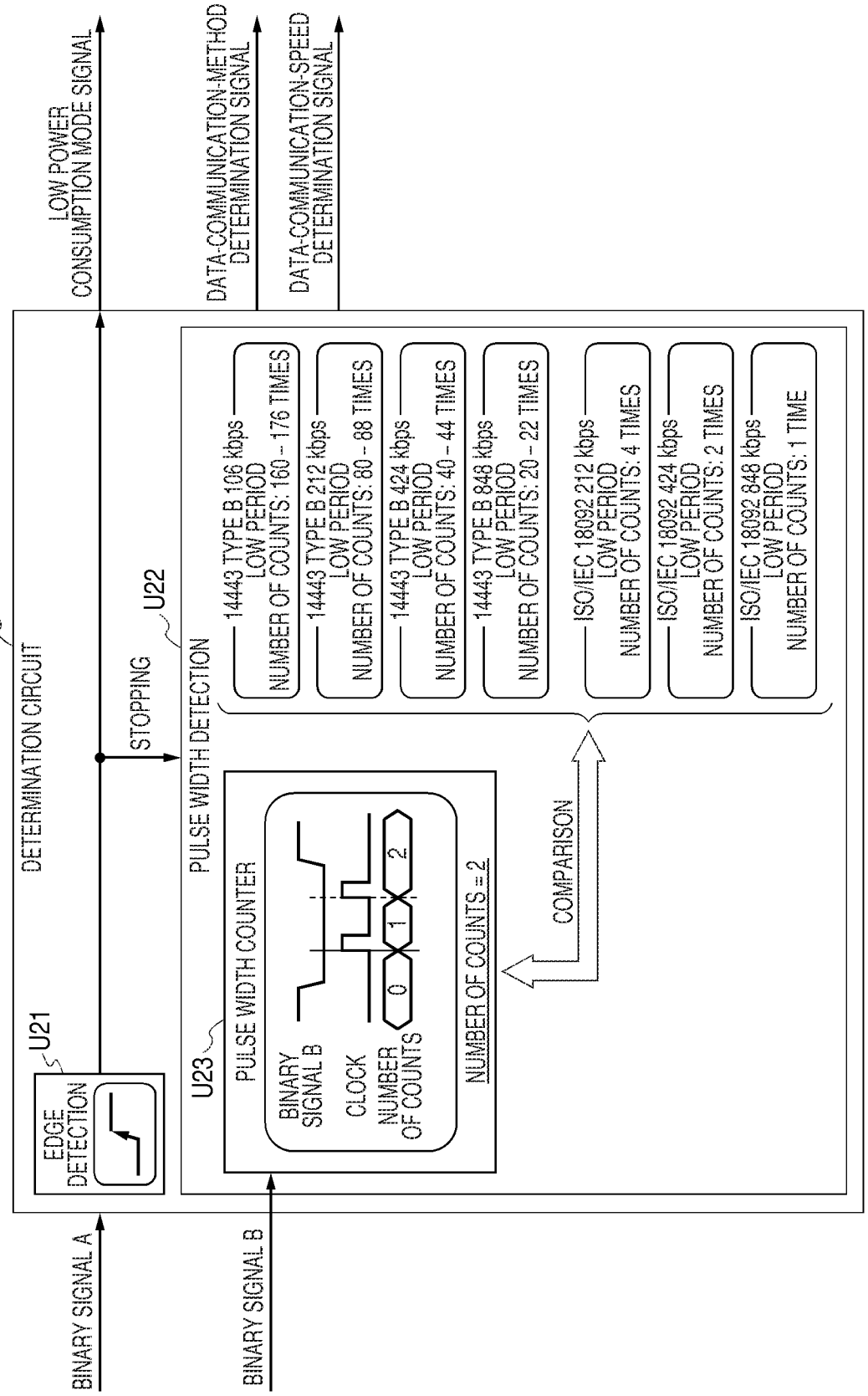
FIG. 11 is a drawing illustrating configuration of a determination circuit included in the noncontact control circuit of the internal circuit of the semiconductor integrated circuit of the noncontact IC card illustrated in FIG. 1.

<<Configuration of a determination circuit>> FIG. 11 illustrates the configuration of the determination circuit U16 included in the noncontact control circuit U9 of the internal circuit U4 of the semiconductor integrated circuit U2 of the noncontact IC card U1 illustrated in FIG. 1.

The determination circuit U16 illustrated in FIG. 11 includes an edge detection circuit U21 which responds to the change from a low level to a high level of the binary signal A from the low sensitivity demodulator circuit U14 of the demodulator circuit U7. The determination circuit U16 includes a pulse width detector U22 to which the binary signal B is supplied from the high sensitivity demodulator circuit U15 of the demodulator circuit U7. The pulse width detector U22 includes a pulse width counter U23.

For example, when the low sensitivity demodulator circuit U14 of the demodulator circuit U7 receives a reception signal of Type A of ISO/IEC 14443 with the degree of ASK modulation of 100%, the binary signal A of the low sensitivity demodulator circuit U14 changes from a low level to a high level. Responding to this level change, the edge detection circuit U21 generates a data-communication-method determination signal of the receiving mode in Type A. This data-communication-method determination signal serves as a low power consumption mode signal which halts operation of the high sensitivity demodulator circuit U15 of the demodulator circuit U7, and also serves as an operation halt control signal to the pulse width detector U22. Therefore, the edge detection circuit U21 of the determination circuit U16 creates the determination result of the determination of the degree of ASK modulation at Step F4-2 of the operation flow illustrated in FIG. 7.

On the other hand, when the high sensitivity demodulator circuit U15 of the demodulator circuit U7 is receiving the reception signal of Type B of ISO/IEC 14443 or ISO/IEC 18092 with the degree of ASK modulation of 10%, the binary signal A from the low sensitivity demodulator circuit U14 is maintained at a low level. Therefore, in order to determine whether the current reception signal is Type B or it is "18092", the pulse width determination of the binary signal B at Step F4-3 of the operation flow of FIG. 7 is necessary. Accordingly, the pulse width counter U23 of the pulse width detector U22 determines the length of the modulation period of the logic "0" for the pulse width determination of the binary signal B. That is, the pulse width counter U23 counts a clock number in the period of the logic "0" of the binary signal B. Four cases of the upper side with the a large number of counts are determined to be a reception signal of Type B of ISO/IEC 14443 with a long modulation period of the logic "0", and three cases of the lower side with a small number of counts are determined to be a reception signal of ISO/IEC 18092 with a short modulation period of the logic "0." In these seven cases, the data communication speed from 106 kbps to 848 kbps can also be determined at the same time. The pulse width detector U22 includes a look-up table (reference table) which links the number of counts with the data communication method and the data communication speed of Type B or "18092."

Figure 12:
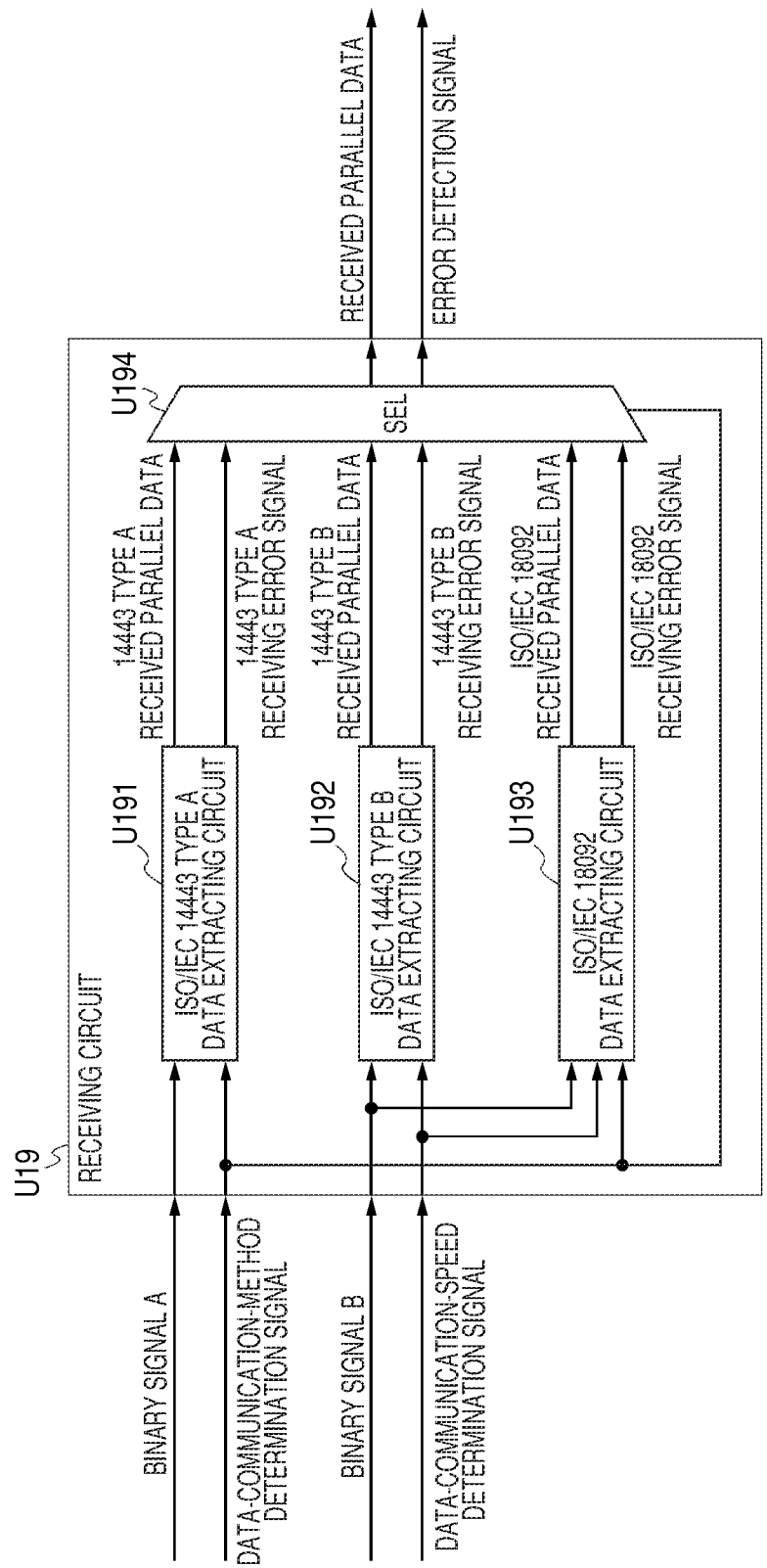
FIG. 12 is a drawing illustrating circuit configuration of a semiconductor integrated circuit according to one embodiment of the present invention.

<<Configuration of a receiving circuit>> FIG. 12 illustrates the configuration of the receiving circuit U19 included in the noncontact control circuit U9 of the internal circuit U4 of the semiconductor integrated circuit U2 of the noncontact IC card U1 illustrated in FIG. 1.

The receiving circuit U19 illustrated in FIG. 12 includes a data extracting circuit U191 of Type A, a data extracting circuit U192 of Type B, a data extracting circuit U193 of "18092", and an output selector U194.

To the data extracting circuit U191 of Type A, the serial binary signal A of the low sensitivity demodulator circuit U14 of the demodulator circuit U7 and the data-communication-method determination signal of the determination circuit U16 are supplied. From the data extracting circuit U191 of Type A, received parallel data and a receiving error signal of Type A are generated and supplied to the output selector U194.

To the data extracting circuit U192 of Type B, the serial binary signal B of the high sensitivity demodulator circuit U15 of the demodulator circuit U7, the data-communication-method determination signal of the determination circuit U16, and the data-communication-speed determination signal are supplied. From the data extracting circuit U192 of Type B, received parallel data and a receiving error signal of Type B are generated and supplied to the output selector U194.

To the data extracting circuit U193 of "18092", the serial binary signal B of the high sensitivity demodulator circuit U15 of the demodulator circuit U7, the data-communication-method determination signal of the determination circuit U16, and the data-communication-speed determination signal are supplied. From the data extracting circuit U193 of "18092", received parallel data and a receiving error signal of "18092" are generated and supplied to the output selector U194.

The data-communication-method determination signal, which is supplied to the data extracting circuit U191, the data extracting circuit U192, the data extracting circuit U193, and the output selector U194 from the determination result register 17, is a method for one of Type A, Type B, and "18092". Therefore, according to a method specified by the data-communication-method determination signal, one of the data extracting circuit U191 of Type A, the data extracting circuit U192 of Type B, and the data extracting circuit U193 of "18092" is activated from the low power consumption state or the deactivation state. Accordingly, the activated data extracting circuit generates the received parallel data and the receiving error signal from the received serial input signal.

Since the data-communication-method determination signal for one of Type A, Type B, and "18092" is supplied to the output selector U194 from the determination circuit U16, the output selector U194 selects the received parallel data and the error detection signal for the one of the methods, transfers the received parallel data to the RAM (U10), and supplies the error detection signal to the receiving error register (U18).

Figure 13:
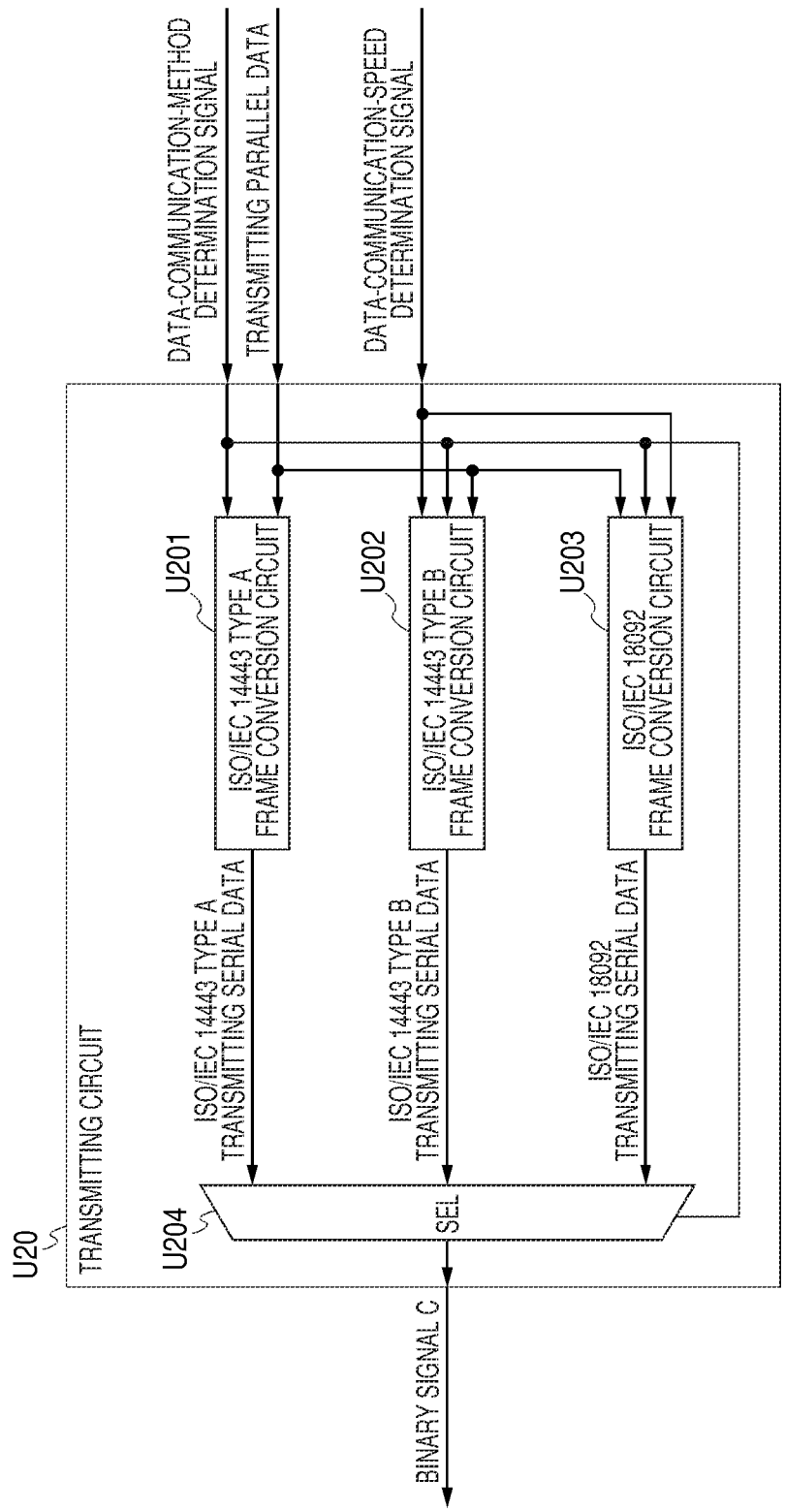
FIG. 13 is a plan view of a silicon chip, illustrating layout of various devices which compose the semiconductor integrated circuit according to one embodiment of the present invention illustrated in FIG. 12.

<<Configuration of a transmitting circuit>> FIG. 13 illustrates the configuration of the transmitting circuit U20 included in the noncontact control circuit U9 of the internal circuit U4 of the semiconductor integrated circuit U2 of the noncontact IC card U1 illustrated in FIG. 1.

The transmitting circuit U20 illustrated in FIG. 13 includes a frame conversion circuit of Type A U201, a frame conversion circuit of Type B U202, a frame conversion circuit of "18092" U203, and an output selector U204.

The data-communication-method determination signal from the determination result register 17 is supplied in common to the frame conversion circuit of Type A U201, the frame conversion circuit of Type B U202, and the frame conversion circuit of "18092" U203. The data-communication-speed determination signal from the determination result register 17 is supplied to the frame conversion circuit of Type B U202 and the frame conversion circuit of "18092" U203. The transmitting parallel data from the RAM (U10) transferred via the bus (BUS) is supplied in common to the frame conversion circuit of Type A U201, the frame conversion circuit of Type B U202, and the frame conversion circuit of "18092" U203.

The data-communication-method determination signal, which is supplied to the frame conversion circuit U201, the frame conversion circuit U202, the frame conversion circuit U203, and the output selector U204 from the determination result register 17, is of a method of one of Type A, Type B, and "18092." Therefore, according to the method specified by the data-communication-method determination signal, one of the frame conversion circuit of Type A U201, the frame conversion circuit of Type B U202, and the frame conversion circuit of "18092" U203 is activated from the low power consumption state or the deactivation state. Accordingly, the activated conversion circuit converts the transmitting parallel data from the RAM (U10) via an exclusive signal line into transmitting serial data, according to the data-communication-speed determination signal from the determination result register 17. The output selector U204 selects the transmitting serial data according to the data-communication-method determination signal, generates the binary signal C, and supplies it to the modulator circuit 8.

As explained above, during the receiving operation of data by the demodulator circuit U7, the determination circuit U16, and the receiving circuit U19, or during the transmitting operation of data by the transmitting circuit U20 and the modulator circuit U8, the CPU (U12) and the bus (BUS), which are not directly related to the demodulation or modulation process of an RF signal and the data transfer with the RAM (U10), can be set to a low power consumption state. Therefore, it is possible to realize reduction of the power consumption at the time of data communication with the noncontact reader/writer device.

<<Reception of Type A>> FIG. 14 illustrates operation in the case where the noncontact IC card U1 illustrated in FIG. 1 receives a reception signal based on the data communication method of Type A of ISO/IEC 14443, from the noncontact reader/writer device.

As illustrated in FIG. 14, when the noncontact IC card U1 goes into the operation field of the noncontact reader/writer device, the parallel demodulation operation by the low sensitivity demodulator circuit U14 and the high sensitivity demodulator circuit U15 in the demodulator circuit U7 of the noncontact IC card U1 is performed. Just before the first downlink communication, the determination circuit U16 determines that the reception signal of Type A of ISO/IEC 14443 with the degree of ASK modulation of 100% is currently received, on the left-hand side at Step F4-2 of FIG. 7. Therefore, the operation of the high sensitivity demodulator circuit U15 is halted by the low power consumption mode signal from the determination circuit U16. Accordingly, the received user data of Type A is received by the low sensitivity demodulator circuit U14 of the demodulator circuit U7 and by the receiving circuit U19 of the noncontact control circuit U9, and then stored in the RAM (U10) via the received parallel data lines as the exclusive signal lines.

Responding to an interrupt signal at the end of storing of the received user data to the RAM (U10), the CPU (U12) is waked (activated) from the halt state, and shifts to the operating state. The CPU (U12) reads out the data stored in the RAM (U10), processes the read-out data according to the processing program for secure electronic banking stored in the ROM (U11) or the EEPROM (U13), and stores the processed result in the RAM (U10) again. When the storing of the processed result in the RAM (U10) by the CPU (U12) is completed, the CPU (U12) shifts to the halt state as a sleep state from an operating state.

Responding to the shift of the CPU (U12) from the operating state to the sleep state, the transmitting circuit (U20) and the modulator circuit (U8)) are waked (activated) from the halt state and shift to the operating state. Accordingly, the transmitting circuit (U20) reads the processed result stored in the RAM (U10) via the transmitting parallel data signal lines as the exclusive signal lines, and transfers it to the modulator circuit (U8). As a result, the first uplink communication to the noncontact reader/writer device by the modulator circuit (U8) is performed.

<<Reception of Type B>> FIG. 15 illustrates operation in the case where the noncontact IC card U1 illustrated in FIG. 1 receives a reception signal based on the data communication method of Type B of ISO/IEC 14443, from the noncontact reader/writer device.

As illustrated in FIG. 15, when the noncontact IC card U1 goes into the operation field of the noncontact reader/writer device, the parallel demodulation operation by the low sensitivity demodulator circuit U14 and the high sensitivity demodulator circuit U15 in the demodulator circuit U7 of the noncontact IC card U1 is performed. Just before the first downlink communication, the determination circuit U16 determines that the reception signal of the degree of ASK modulation of 10% is currently received, on the right-hand side at Step F4-2 of FIG. 7. The determination circuit U16 determines that the reception signal of Type B of ISO/IEC 14443 or the reception signal of ISO/IEC 18092 is currently received, by the pulse width determination of the binary signal B at Step F4-3 of FIG. 7. When the determination circuit U16 determines that the modulation period of the logic "0" is long, the determination circuit U16 determines that the reception signal of Type B of ISO/IEC 14443 is currently received and performs determining of a data communication speed of 106 kbps, as illustrated in the result on the left-hand side at Step F4-3, and at Step F4-5. Consequently, the operation of the low sensitivity demodulator circuit U14 is halted by the low power consumption mode signal from the determination circuit U16. Therefore, the received user data of Type B is received by the high sensitivity demodulator circuit U15 of the demodulator circuit U7 and by the receiving circuit U19 of the noncontact control circuit U9, and then stored in the RAM (U10) via the received parallel data lines as the exclusive signal lines.

Responding to an interrupt signal at the end of storing of the received user data to the RAM (U10), the CPU (U12) is waked (activated) from the halt state, and shifts to the operating state. The CPU (U12) reads out the data stored in the RAM (U10), processes the read-out data according to the processing program for secure electronic banking stored in the ROM (U11) or the EEPROM (U13), and stores the processed result in the RAM (U10) again. When the storing of the processed result in the RAM (U10) by the CPU (U12) is completed, the CPU (U12) shifts to the halt state as a sleep state from an operating state.

Responding to the shift of the CPU (U12) from the operating state to the sleep state, the transmitting circuit (U20) and the modulator circuit (U8)) are waked (activated) from the halt state and shift to the operating state. Accordingly, the transmitting circuit (U20) reads the processed result stored in the RAM (U10) via the transmitting parallel data signal lines as the exclusive signal lines, and transfers it to the modulator circuit (U8). As a result, the first uplink communication to the noncontact reader/writer device by the modulator circuit (U8) is performed.

<<Reception of "18092">> FIG. 16 illustrates operation in the case where the noncontact IC card U1 illustrated in FIG. 1 receives a reception signal based on the data communication method of ISO/IEC 18092, from the noncontact reader/writer device.

As illustrated in FIG. 16, when the noncontact IC card U1 goes into the operation field of the noncontact reader/writer device, the parallel demodulation operation by the low sensitivity demodulator circuit U14 and the high sensitivity demodulator circuit U15 in the demodulator circuit U7 of the noncontact IC card U1 is performed. Just before the first downlink communication, the determination circuit U16 determines that the reception signal with the degree of ASK modulation of 10% is currently received, on the right-hand side at Step F4-2 of FIG. 7. The determination circuit U16 determines that the reception signal of Type B of ISO/IEC 14443 or the reception signal of ISO/IEC 18092 is currently received, by the pulse width determination of the binary signal B at Step F4-3 of FIG. 7. When the determination circuit U16 determines that the modulation period of the logic "0" is short, the determination circuit U16 determines that the reception signal of ISO/IEC 18092 is currently received, and performs determining of the data communication speed of 424 kbps, as illustrated in the result on the low-hand side at Step F4-3, and at Step F4-6. Consequently, the operation of the low sensitivity demodulator circuit U14 is halted by the low power consumption mode signal from the determination circuit U16. Therefore, the received user data of "18092" is received by the high sensitivity demodulator circuit U15 of the demodulator circuit U7 and by the receiving circuit U19 of the noncontact control circuit U9, and then stored in the RAM (U10) via the received parallel data lines as the exclusive signal lines.

Responding to an interrupt signal at the end of storing of the received user data to the RAM (U10), the CPU (U12) is waked (activated) from the halt state, and shifts to the operating state. The CPU (U12) reads out the data stored in the RAM (U10), processes the read-out data according to the processing program for secure electronic banking stored in the ROM (U11) or the EEPROM (U13), and stores the processed result in the RAM (U10) again. When the storing of the processed result in the RAM (U10) by the CPU (U12) is completed, the CPU (U12) shifts to the halt state as a sleep state from an operating state.

Responding to the shift of the CPU (U12) from the operating state to the sleep state, the transmitting circuit (U20) and the modulator circuit (U8) are waked (activated) from the halt state and shift to the operating state. Accordingly, the transmitting circuit (U20) reads the processed result stored in the RAM (U10) via the transmitting parallel data signal lines as the exclusive signal lines, and transfers it to the modulator circuit (U8). As a result, the first uplink communication to the noncontact reader/writer device by the modulator circuit (U8) is performed.

Figure 17:
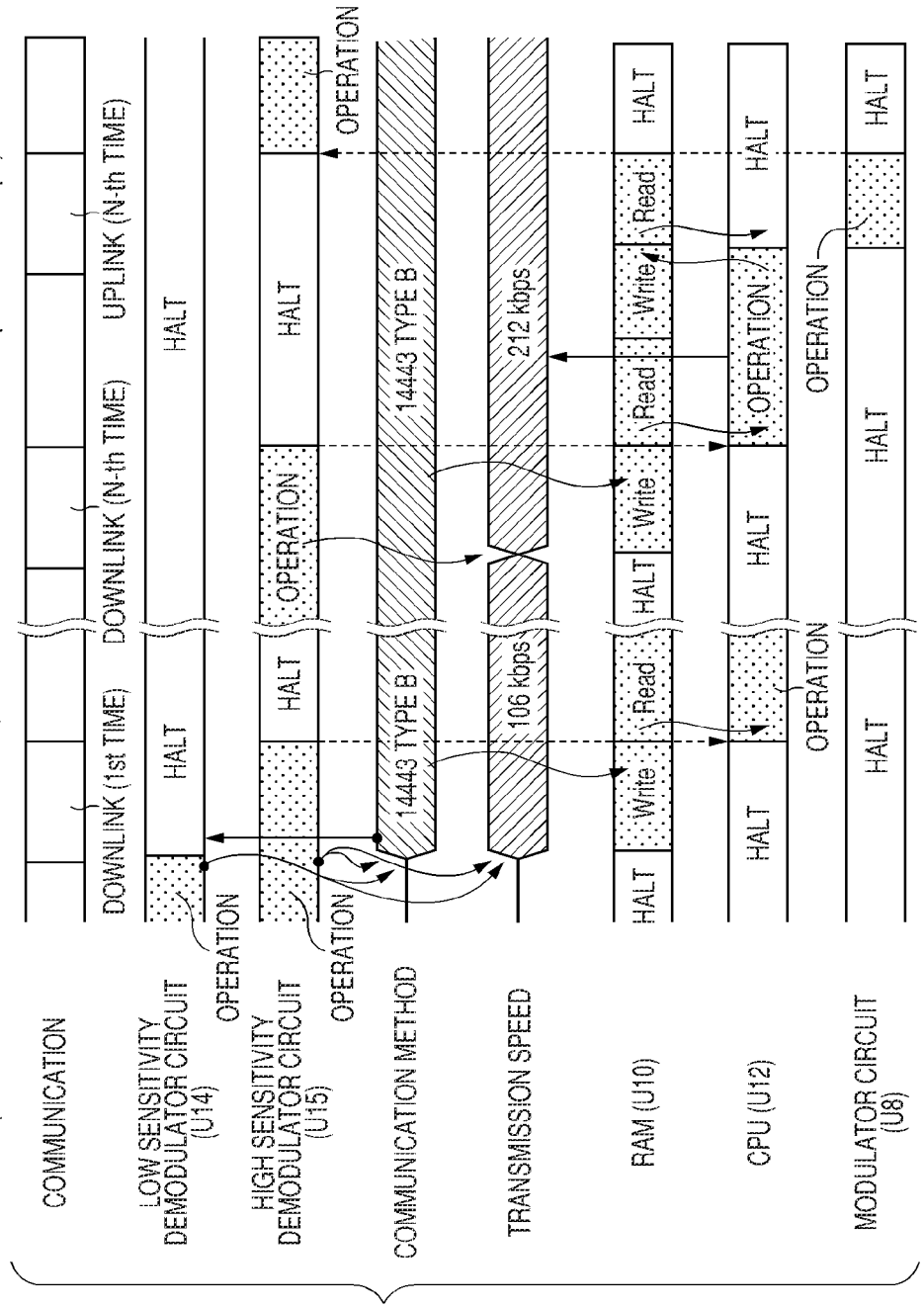
FIG. 17 is a drawing illustrating operation in the case where a data communication speed is changed while the noncontact IC card illustrated in FIG. 1 receives a reception signal based on the data communication method of Type B of ISO/IEC 14443 from a noncontact reader/writer device, and where the noncontact IC card receives again a reception signal based on the same Type B.

<<Change of data communication speed in the course of reception>> FIG. 17 illustrates operation in the case where a data communication speed is changed while the noncontact IC card U1 illustrated in FIG. 1 receives a reception signal based on the data communication method of Type B of ISO/IEC 14443 from the noncontact reader/writer device, and where the noncontact IC card receives again a reception signal based on the same Type B.

Although the operation of the first downlink communication of FIG. 17 is the same as the operation of the first downlink communication of FIG. 15, in the case of the N-th downlink communication of FIG. 17, the data communication speed of the reception signal of Type B of ISO/IEC 14443 from the noncontact reader/writer device is changed from the lowest speed of 106 kbps to the medium low speed of 212 kbps. The change of the data communication speed is detectable by the determination of the transmission speed of the reception signal of Type B by the pulse width determination of the binary signal B performed by the determination circuit U16 at Step F3-3 of FIG. 8. Since the newly-detected changed data communication speed is written in the determination result register U17, the data communication speed of transmission of the transmitting circuit U20 is changed to the medium low speed of 212 kbps. The receiving circuit U19 also converts the serial binary signal B into the received parallel data, corresponding to the newly-detected changed data communication speed. The data communication speed can be arbitrarily changed from one of 106 kbps, 212 kbps, 424 kbps, and 848 kbps to another one of 106 kbps, 212 kbps, 424 kbps, and 848 kbps.

During receiving of the reception signal not only of Type B of ISO/IEC 14443 but also of ISO/IEC 18092 method, the data communication speed can be arbitrarily changed from one of 212 kbps, 424 kbps, and 848 kbps to another one of 212 kbps, 424 kbps, and 848 kbps.

Figure 19:
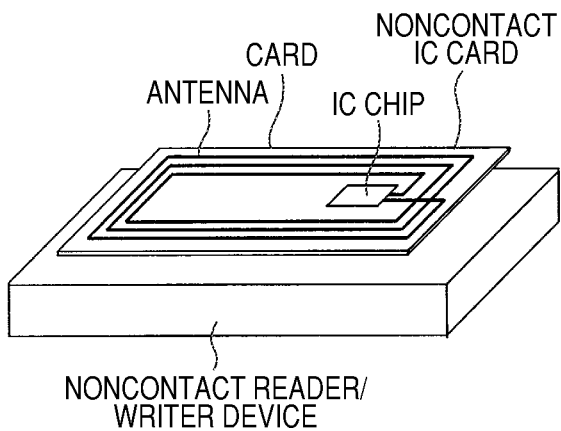
FIG. 19 is a drawing illustrating structure of the noncontact IC card U1 illustrated in FIG. 1.

<<Structure of a noncontact IC card>> FIG. 19 illustrates structure of the noncontact IC card U1 illustrated in FIG. 1.

The noncontact IC card U1 illustrated in FIG. 19 has the shape of a card by employing a printed circuit board which is resin-molded. The antenna which receives electromagnetic waves from an external noncontact reader/writer device is composed by a spiral coil formed with wiring disposed over the printed circuit board. A semiconductor integrated circuit U2 which is formed in one IC chip is mounted over the printed circuit board, and the coil used as an antenna is coupled to the IC chip.

In this way, the noncontact IC card U1 of FIG. 19 does not have a battery, unlike a mobile phone, and operates with operating voltage of low driving capacity which is generated by the IC card single body, by rectifying and smoothing an RF signal received by the antenna when the IC card single body is brought within the range of an operation field of a noncontact reader/writer device.

Figure 20:
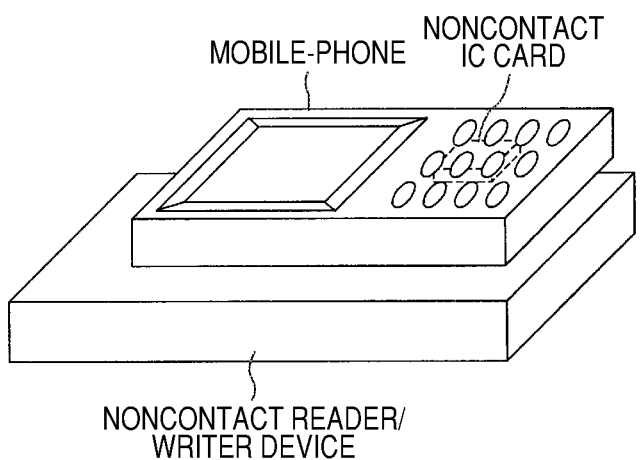
FIG. 20 is a drawing illustrating appearance of the noncontact IC card illustrated in FIG. 1, mounted in a mobile phone.

<<A noncontact IC card mounted in a mobile phone>> FIG. 20 illustrates appearance of the noncontact IC card illustrated in FIG. 1, mounted in a mobile phone.

The noncontact IC card illustrated in FIG. 20 has an IC chip and an antenna formed over a printed circuit board, like the noncontact IC card illustrated in FIG. 19. However, the noncontact IC card of FIG. 20 is made as an appearance much smaller than the noncontact IC card of FIG. 19, so as to be able to be mounted in the mobile phone. Therefore, the noncontact IC card illustrated in FIG. 20 can operate by the operating voltage of a battery built in the mobile phone, in a similar manner as other semiconductor integrated circuits mounted in the mobile phone, such as a semiconductor integrated circuit having a mobile communications function, a liquid crystal display controller driver, etc. Also in this case, it is possible to realize low power consumption by bringing each circuit into a low power consumption state in response to a low power consumption mode signal.

The noncontact IC card illustrated in FIG. 20 is not only mounted in a mobile phone, but can be built in a portable information terminal at large, such as a pocket-book-size personal computer called PDA (Personal Digital Assistant) and a notebook-size personal computer.

In the above, the invention accomplished by the present inventors has been specifically explained based on the embodiments. However, it cannot be overemphasized that the present invention is not restricted to the embodiments, and it can be changed variously in the range which does not deviate from the gist.

For example, the present invention is not restricted to a noncontact IC card, but can also be applied to a dual type IC card having a contact interface of a contact-type input-output terminals and a noncontact interface.

In the noncontact IC card illustrated in FIG. 1, the semiconductor integrated circuit U2 is not restricted to the single chip configuration, and can be made as the multichip configuration having a first chip and a second chip. For example, the first chip includes the power circuit U2, the demodulator circuit U7, the modulator circuit U8, and the noncontact control circuit U9. The second chip not only may include the RAM (U10), the ROM (U11), the CPU (U12), the EEPROM (U13), and the bus (BUS), but may include an interface circuit for communication with the first chip.

The data transfer between the receiving circuit U19 or the transmitting circuits U20 and the RAM (U10) which are mounted in the semiconductor integrated circuit of FIG. 1 is performed via the received parallel data line or the transmitting parallel data line as the exclusive signal lines. However, the data transfer is not restrictedly performed via the exclusive signal lines, but the data transfer may be performed via the bus (BUS) coupled to the CPU (U12) or via other peripheral buses.

In the data transfer to the RAM (U10), the configuration is not restricted to what stores data sequentially from the fixed address of the RAM (U10), but it is also possible to employ what stores data in arbitrary addresses by using a memory control circuit.

Furthermore, the present invention can be applied not only to communication by the digital modulation method of an ASK system, but can be applied to communication by the digital modulation method by a frequency shift keying (FSK), a phase shift keying (PSK), etc.

What is claimed is:

1. A semiconductor integrated circuit comprising:
a first antenna coupling terminal;
a second antenna coupling terminal;
a power circuit;
a demodulator circuit; and
a determination circuit,
wherein a Radio Frequency (RF) signal received by an antenna is supplied between the first antenna coupling terminal and the second antenna coupling terminal,
wherein the RF signal is an Amplitude Shift Keying (ASK) modulated carrier,
wherein the power circuit supplies the demodulator circuit and the determination circuit with operating voltage generated by rectifying and smoothing the RF signal,
wherein the demodulator circuit includes a first demodulator circuit and a second demodulator circuit,
wherein the RF signal supplied between the first antenna coupling terminal and the second antenna coupling terminal is supplied in parallel to an input of the first demodulator circuit and an input of the second demodulator circuit,
wherein the first demodulator circuit demodulates a first reception signal having a first degree of modulation as the RF signal and generates a first demodulated output signal,
wherein the second demodulator circuit demodulates a second reception signal having a second degree of modulation different from the first degree of modulation as the RF signal and having a first communication start signal in a first format and a third reception signal having the second degree of modulation and a second communication start signal in a second format, and generates a second demodulated output signal, wherein the first demodulated output signal of the first demodulator circuit and the second demodulated output signal of the second demodulator circuit are supplied to the determination circuit, wherein, when the determination circuit determines that the first demodulator circuit generates the first demodulated output signal, the determination circuit determines that the first reception signal having the first degree of modulation is received as the RF signal, wherein, when the determination circuit determines that the first demodulator circuit does not generate the first demodulated output signal, the determination circuit determines a difference in format between the first communication start signal and the second communication start signal, wherein, when the determination circuit determines that the second demodulator circuit generates the second demodulated output signal by demodulating the second reception signal having the first communication start signal in the first format, the determination circuit determines that the second reception signal is received as the RF signal, and wherein, when the determination circuit determines that the second demodulator circuit generates the second demodulated output signal by demodulating the third reception signal having the second communication start signal in the second format, the determination circuit determines that the third reception signal is received as the RF signal.

2. The semiconductor integrated circuit according to claim 1, wherein, when the determination circuit determines that the first demodulator circuit generates the first demodulated output signal, operation of the second demodulator circuit is halted by a control signal generated by the determination circuit, and wherein, when the determination circuit determines that the first demodulator circuit does not generate the first demodulated output signal, operation of the first demodulator circuit is halted by the control signal generated by the determination circuit.

3. The semiconductor integrated circuit according to claim 2, wherein the first reception signal, the second reception signal, and the third reception signal are an ASK modulation signal, the first degree of modulation and the second degree of modulation are given by the degree of ASK modulation, and the second degree of modulation has a smaller degree of ASK modulation than the first degree of modulation, wherein the first demodulator circuit demodulates the first reception signal having the first degree of modulation of the great degree of ASK modulation, and generates the first demodulated output signal, and wherein the second demodulator circuit demodulates the second reception signal and the third reception signal having the second degree of modulation of the small degree of ASK modulation, and generates the second demodulated output signal.

4. The semiconductor integrated circuit according to claim 3, wherein the first communication start signal of the first format of the second reception signal is first header information preceding first user data, and the second communication start signal of the second format of the third reception signal is second header information preceding second user data.

5. The semiconductor integrated circuit according to claim 4, further comprising:
a central processing unit;
a random access memory;
a nonvolatile memory;
a receiving circuit;
a transmitting circuit; and
a modulator circuit, wherein a processing program to be executed by the central processing unit is stored in the nonvolatile memory, wherein first received data included in the first demodulated output signal generated by the first demodulator circuit and second received data included in the second demodulated output signal generated by the second demodulator circuit are stored in the random access memory through the receiving circuit, wherein the central processing unit is controlled to be in a low-power consumption state before one of the first received data and the second received data is stored in the random access memory, and is shifted from the low-power consumption state to an operating state, in response to the storing of the one of the first received data and the second received data in the random access memory, wherein the central processing unit shifted to the operating state reads out data stored in the random access memory, processes the stored data read out from the random access memory according to the processing program, stores the processed data concerned to the random access memory, and is shifted from the operating state to the low-power consumption state after the storing concerned, wherein the transmitting circuit reads out the processed data from the random access memory and transfers the read data concerned to the modulator circuit, and wherein, in response to the transferred data concerned, the modulator circuit generates an RF transmitting signal to be transmitted from the antenna.

6. The semiconductor integrated circuit according to claim 5, wherein the first reception signal conforms to the international standard ISO/IEC 14443 Type A, the second reception signal conforms to the international standard ISO/IEC 14443 Type B, and the third reception signal conforms to the international standard ISO/IEC 18092.

7. An Integrated Circuit (IC) card comprising:
a semiconductor integrated circuit mounted over a substrate; and
an antenna formed by wiring disposed over the substrate, wherein the semiconductor integrated circuit includes a first antenna coupling terminal, a second antenna coupling terminal, a power circuit, a demodulator circuit, and a determination circuit, wherein a Radio Frequency (RF) signal received by the antenna is supplied between the first antenna coupling terminal and the second antenna coupling terminal, wherein the RF signal is an Amplitude Shift Keying (ASK) modulated carrier, wherein the power circuit supplies the demodulator circuit and the determination circuit with operating voltage generated by rectifying and smoothing the RF signal, wherein the demodulator circuit includes a first demodulator circuit and a second demodulator circuit, wherein the RF signal supplied between the first antenna coupling terminal and the second antenna coupling terminal is supplied in parallel to an input of the first demodulator circuit and an input of the second demodulator circuit, wherein the first demodulator circuit demodulates a first reception signal having a first degree of modulation as the RF signal and generates a first demodulated output signal, wherein the second demodulator circuit demodulates a second reception signal having a second degree of modulation different from the first degree of modulation as the RF signal and having a first communication start signal in a first format and a third reception signal having the second degree of modulation and a second communication start signal in a second format, and generates a second demodulated output signal, wherein the first demodulated output signal of the first demodulator circuit and the second demodulated output signal of the second demodulator circuit are supplied to the determination circuit, wherein, when the determination circuit determines that the first demodulator circuit generates the first demodulated output signal, the determination circuit determines that the first reception signal having the first degree of modulation is received as the RF signal, wherein, when the determination circuit determines that the first demodulator circuit does not generate the first demodulated output signal, the determination circuit determines a difference in format between the first communication start signal and the second communication start signal, wherein, when the determination circuit determines that the second demodulator circuit generates the second demodulated output signal by demodulating the second reception signal having the first communication start signal in the first format, the determination circuit determines that the second reception signal is received as the RF signal, and wherein, when the determination circuit determines that the second demodulator circuit generates the second demodulated output signal by demodulating the third reception signal having the second communication start signal in the second format, the determination circuit determines that the third reception signal is received as the RF signal.

8. The IC card according to claim 7, wherein, when the determination circuit determines that the first demodulator circuit generates the first demodulated output signal, operation of the second demodulator circuit is halted by a control signal generated by the determination circuit, and wherein, when the determination circuit determines that the first demodulator circuit does not generate the first demodulated output signal, operation of the first demodulator circuit is halted by the control signal generated by the determination circuit.

9. The IC card according to claim 8, wherein the first reception signal, the second reception signal, and the third reception signal are an ASK modulation signal, the first degree of modulation and the second degree of modulation are given by the degree of ASK modulation, and the second degree of modulation has a smaller degree of ASK modulation than the first degree of modulation, wherein the first demodulator circuit demodulates the first reception signal having the first degree of modulation of the great degree of ASK modulation, and generates the first demodulated output signal, and wherein the second demodulator circuit demodulates the second reception signal and the third reception signal having the second degree of modulation of the small degree of ASK modulation, and generates the second demodulated output signal.

10. The IC card according to claim 9, wherein the first communication start signal of the first format of the second reception signal is first header information preceding first user data, and the second communication start signal of the second format of the third reception signal is second header information preceding second user data.

11. The IC card according to claim 10, wherein the semiconductor integrated circuit further includes a central processing unit, a random access memory, a nonvolatile memory, a receiving circuit, a transmitting circuit, and a modulator circuit, wherein a processing program to be executed by the central processing unit is stored in the nonvolatile memory, wherein first received data included in the first demodulated output signal generated by the first demodulator circuit and second received data included in the second demodulated output signal generated by the second demodulator circuit are stored in the random access memory through the receiving circuit, wherein the central processing unit is controlled to be in a low-power consumption state before one of the first received data and the second received data is stored in the random access memory, and is shifted from the low-power consumption state to an operating state, in response to the storing of the one of the first received data and the second received data in the random access memory, wherein the central processing unit shifted to the operating state reads out data stored in the random access memory, processes the stored data read out from the random access memory according to the processing program, stores the processed data concerned to the random access memory, and is shifted from the operating state to the low-power consumption state after the storing concerned, wherein the transmitting circuit reads out the processed data from the random access memory and transfers the read data concerned to the modulator circuit, and wherein, in response to the transferred data concerned, the modulator circuit generates an RF transmitting signal to be transmitted from the antenna.

12. The IC card according to claim 11, wherein the first reception signal conforms to the international standard ISO/IEC 14443 Type A, the second reception signal conforms to the international standard ISO/IEC 14443 Type B, and the third reception signal conforms to the international standard ISO/IEC 18092.

13. An operating method for an Integrated Circuit (IC) card, the IC card comprising:

a semiconductor integrated circuit mounted over a substrate; and an antenna formed by wiring disposed over the substrate, wherein the semiconductor integrated circuit includes a first antenna coupling terminal, a second antenna coupling terminal, a power circuit, a demodulator circuit, and a determination circuit, wherein a Radio Frequency (RF) signal received by the antenna is supplied between the first antenna coupling terminal and the second antenna coupling terminal, wherein the RF signal is an Amplitude Shift Keying (ASK) modulated carrier, wherein the power circuit supplies the demodulator circuit and the determination circuit with operating voltage generated by rectifying and smoothing the RF signal, wherein the demodulator circuit includes a first demodulator circuit and a second demodulator circuit, wherein the RF signal supplied between the first antenna coupling terminal and the second antenna coupling terminal is supplied in parallel to an input of the first demodulator circuit and an input of the second demodulator circuit, wherein the first demodulator circuit demodulates a first reception signal having a first degree of modulation as the RF signal and generates a first demodulated output signal, wherein the second demodulator circuit demodulates a second reception signal having a second degree of modulation different from the first degree of modulation as the RF signal and having a first communication start signal in a first format and a third reception signal having the second degree of modulation and a second communication start signal in a second format, and generates a second demodulated output signal, wherein the first demodulated output signal of the first demodulator circuit and the second demodulated output signal of the second demodulator circuit are supplied to the determination circuit, wherein, when the determination circuit determines that the first demodulator circuit generates the first demodulated output signal, the determination circuit determines that the first reception signal having the first degree of modulation is received as the RF signal, wherein, when the determination circuit determines that the first demodulator circuit does not generate the first demodulated output signal, the determination circuit determines a difference in format between the first communication start signal and the second communication start signal, wherein, when the determination circuit determines that the second demodulator circuit generates the second demodulated output signal by demodulating the second reception signal having the first communication start signal in the first format, the determination circuit determines that the second reception signal is received as the RF signal, and wherein, when the determination circuit determines that the second demodulator circuit generates the second demodulated output signal by demodulating the third reception signal having the second communication start signal in the second format, the determination circuit determines that the third reception signal is received as the RF signal.

14. The operating method for the IC card according to claim 13, wherein, when the determination circuit determines that the first demodulator circuit generates the first demodulated output signal, operation of the second demodulator circuit is halted by a control signal generated by the determination circuit, and wherein, when the determination circuit determines that the first demodulator circuit does not generate the first demodulated output signal, operation of the first demodulator circuit is halted by the control signal generated by the determination circuit.

15. The operating method for the IC card according to claim 14, wherein the first reception signal, the second reception signal, and the third reception signal are an ASK modulation signal, the first degree of modulation and the second degree of modulation are given by the degree of ASK modulation, and the second degree of modulation has a smaller degree of ASK modulation than the first degree of modulation, wherein the first demodulator circuit demodulates the first reception signal having the first degree of modulation of the great degree of ASK modulation, and generates the first demodulated output signal, and wherein the second demodulator circuit demodulates the second reception signal and the third reception signal having the second degree of modulation of the small degree of ASK modulation, and generates the second demodulated output signal.

16. The operating method for the IC card according to claim 15, wherein the first communication start signal of the first format of the second reception signal is first header information preceding first user data, and the second communication start signal of the second format of the third reception signal is second header information preceding second user data.

17. The operating method for the IC card according to claim 16, wherein the semiconductor integrated circuit further includes a central processing unit, a random access memory, a nonvolatile memory, a receiving circuit, a transmitting circuit, and a modulator circuit, wherein a processing program to be executed by the central processing unit is stored in the nonvolatile memory, wherein first received data included in the first demodulated output signal generated by the first demodulator circuit and second received data included in the second demodulated output signal generated by the second demodulator circuit are stored in the random access memory through the receiving circuit, wherein the central processing unit is controlled to be in a low-power consumption state before one of the first received data and the second received data is stored in the random access memory, and is shifted from the low-power consumption state to an operating state, in response to the storing of the one of the first received data and the second received data in the random access memory, wherein the central processing unit shifted to the operating state reads out data stored in the random access memory, processes the stored data read out from the random access memory according to the processing program, stores the processed data concerned to the random access memory, and is shifted from the operating state to the low-power consumption state after the storing concerned, wherein the transmitting circuit reads out the processed data from the random access memory and transfers the read data concerned to the modulator circuit, and wherein, in response to the transferred data concerned, the modulator circuit generates an RF transmitting signal to be transmitted from the antenna.

18. The operating method for the IC card according to claim 17, wherein the first reception signal conforms to the international standard ISO/IEC 14443 Type A, the second reception signal conforms to the international standard ISO/IEC 14443 Type B, and the third reception signal conforms to the international standard ISO/IEC 18092.

* * * * *